United States Patent
Yoshimura

(10) Patent No.: US 7,456,824 B2
(45) Date of Patent: Nov. 25, 2008

(54) COORDINATE INPUT APPARATUS WITH REGION RECOGNITION

(75) Inventor: Yuichiro Yoshimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 613 days.

(21) Appl. No.: 10/876,710

(22) Filed: Jun. 28, 2004

(65) Prior Publication Data
US 2005/0001824 A1    Jan. 6, 2005

(30) Foreign Application Priority Data
Jul. 1, 2003    (JP) ............................. 2003-189601

(51) Int. Cl.
G06F 3/041 (2006.01)
G06K 11/06 (2006.01)
G06F 3/033 (2006.01)

(52) U.S. Cl. .................. 345/173; 345/902; 178/18.01; 178/19.01

(58) Field of Classification Search ................ 345/173, 345/902; 178/18.01–20.04
See application file for complete search history.

(56) References Cited

U.S. PATENT DOCUMENTS

| | | | | |
|---|---|---|---|---|
| 4,507,557 A * | 3/1985 | Tsikos | | 250/341.7 |
| 4,553,842 A * | 11/1985 | Griffin | | 356/621 |
| 4,710,760 A * | 12/1987 | Kasday | | 345/175 |
| 4,883,926 A * | 11/1989 | Baldwin | | 178/19.01 |
| 5,073,685 A * | 12/1991 | Kobayashi et al. | | 178/19.02 |
| 5,410,334 A * | 4/1995 | Comerford | | 345/179 |
| 5,621,438 A | 4/1997 | Kamimura et al. | | 345/178 |
| 5,854,850 A * | 12/1998 | Linford et al. | | 382/128 |
| 6,005,549 A * | 12/1999 | Forest | | 345/157 |
| 6,091,405 A * | 7/2000 | Lowe et al. | | 345/175 |
| 6,100,538 A * | 8/2000 | Ogawa | | 250/559.29 |
| 6,429,856 B1 * | 8/2002 | Omura et al. | | 345/175 |
| 6,459,424 B1 * | 10/2002 | Resman | | 345/173 |
| 6,492,633 B2 * | 12/2002 | Nakazawa et al. | | 250/221 |
| 6,570,103 B1 * | 5/2003 | Saka et al. | | 178/18.01 |
| 6,594,023 B1 * | 7/2003 | Omura et al. | | 356/620 |
| 6,608,619 B2 * | 8/2003 | Omura et al. | | 345/175 |
| 6,717,073 B2 * | 4/2004 | Xu et al. | | 178/18.04 |
| 7,050,048 B2 * | 5/2006 | Ito | | 345/175 |
| 7,075,054 B2 * | 7/2006 | Iwamoto et al. | | 250/221 |
| 7,184,030 B2 * | 2/2007 | McCharles et al. | | 345/173 |
| 2002/0008692 A1 * | 1/2002 | Omura et al. | | 345/173 |

(Continued)

FOREIGN PATENT DOCUMENTS

JP    6-342336    12/1994

(Continued)

OTHER PUBLICATIONS

Japanese Official Action dated Feb. 29, 2008, regarding Application No. 2003-189601.

*Primary Examiner*—Amare Mengistu
*Assistant Examiner*—Jennifer Zubajlo
(74) *Attorney, Agent, or Firm*—Fitzpatrick, Cella, Harper & Scinto

(57) ABSTRACT

A pointed position on a coordinate input region is detected, and the coordinates of the pointed position are calculated. A region on the coordinate input region, to which the calculated coordinates belong, is determined. Pen-down information corresponding to the pointed position is generated on the basis of the determined region to which the coordinates belong.

14 Claims, 21 Drawing Sheets

U.S. PATENT DOCUMENTS

2003/0006973 A1  1/2003  Omura et al. ............... 345/175
2005/0001824 A1* 1/2005  Yoshimura ................. 345/179

FOREIGN PATENT DOCUMENTS

| JP | A-9-114592 | 5/1997 |
| JP | 11-161425 | 6/1999 |
| JP | B2-2986234 | 12/1999 |
| JP | A-2000-105671 | 4/2000 |
| JP | A-2001-117685 | 4/2001 |
| JP | A-2001-142642 | 5/2001 |
| JP | 2002-351615 | 12/2002 |

* cited by examiner

F I G. 3A
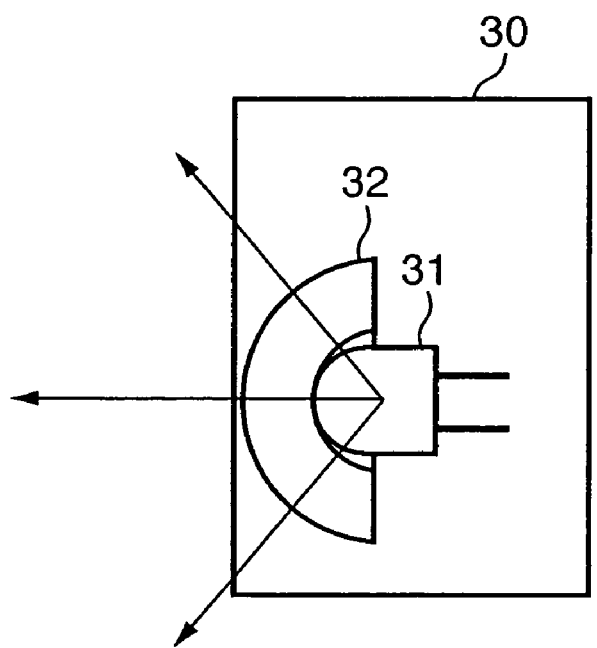
F I G. 3B
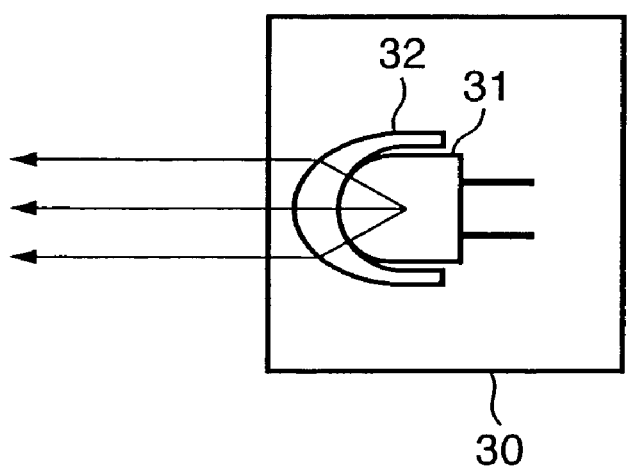

FIG. 14
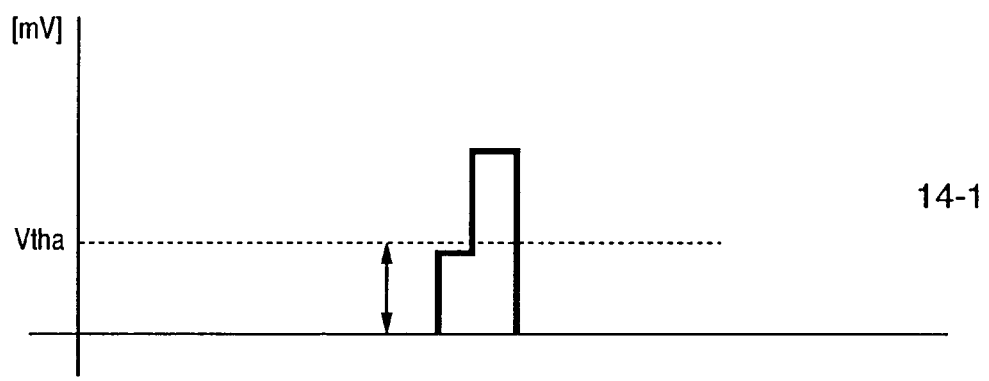
14-1
14-2

COORDINATE INPUT APPARATUS WITH REGION RECOGNITION

FIELD OF THE INVENTION

The present invention relates to a coordinate input apparatus which calculates a pointed position on a coordinate input region, and a control method and program thereof.

BACKGROUND OF THE INVENTION

There exist coordinate input apparatuses which are used to input coordinates to an input surface by using a pointer or finger to control a connected computer or write characters or graphics.

Conventionally, as coordinate input apparatuses of this type, touch panels of various methods have been proposed or become commercially available. These coordinate input apparatuses are widely used because a terminal such as a personal computer can easily be operated on the screen without using any special tool.

There are various coordinate input methods using, e.g., a resistive film or an ultrasonic wave. A method using light is also known, as described in U.S. Pat. No. 4,507,557. In this method, a retroreflecting sheet is arranged outside the coordinate input region. By illumination units which are arranged at the corners of the coordinate input region to illuminate an object with light and light-receiving units which receive light, the angles between the light-receiving units and a shielding object such as a finger that shields light in the coordinate input region are calculated. On the basis of the detection result, the pointing position of the shielding object is determined.

Japanese Patent Laid-Open No. 2000-105671 or 2001-142642 discloses an apparatus in which a retroreflecting member is arranged near the coordinate input region, and the coordinates of a point where retroreflected light is shielded are detected.

In, e.g., the apparatus described in Japanese Patent Laid-Open No. 2000-105671, the peak of a light-shielded portion by a shielding object, which is received by the light-receiving unit, is detected by waveform processing such as differential. With this processing, the angle of the light-shielded portion with respect to the light-receiving unit is detected, and the coordinates of the shielding object are calculated from the detection result. In Japanese Patent Laid-Open No. 2001-142642, comparison with a specific level pattern is done to detect one end and the other end of a light-shielded part and the center of the coordinates is detected.

In U.S. Pat. No. 4,507,557, pixels of a RAM imager serving as a light-receiving unit are read out and compared by a comparator to detect a light-shielded portion. If a light-shielded portion having a predetermined width or more is present, the center (½ position) of the pixels at the two ends is detected. On the basis of the detection result, the coordinates of the shielding object are calculated.

In the above-described method (retroreflective light shielded portion detection method) of detecting a light-shielded portion by a light-shielding object, however, the light beam to be shielded has a predetermined width that almost equals the width of the retroreflecting member in a direction perpendicular to the coordinate input surface. This poses no serious problem for switch input by a finger or the like. However, when a user is to input a character locus by using a pointer, the detection timing of pen-down operation at the start of input and that of pen-up operation at the end of input are delayed.

To solve this problem, a pen point switch means which executes a switch operation sensitively upon contacting the input surface may be arranged at the tip portion of a pointer such that the pen-up and pen-down timings are detected on the basis of a pen point switch signal obtained from the pen point switch means. However, when this structure is implemented, pen-down by a tool except the pointer, e.g., input by a finger is impossible.

Concerning this point, Japanese Patent Laid-Open No. 9-114592 discloses an arrangement including a switching means so as to implement a function of combining pen input (input of pen-up and pen-down signals) by a pointer and mouse input. In this case, however, the switching means is necessary, and this makes the operability poor.

In Japanese Patent No. 2986234, relative coordinate display and absolute coordinate display are switched in accordance with the coordinate input region. However, this arrangement cannot solve the problem of operability by the pen-up/pen-down detection timing in the retroreflective light shielded portion detection method.

Japanese Patent Laid-Open No. 2001-117685 discloses an arrangement which switches the mode by determining the inside or outside of a window region. However, this is switching between a handwriting input mode and a mouse input mode and not switching of the pen-up/pen-down detection timing. Hence, an improvement of operability in the retroreflective light shielded portion detection method cannot be expected.

SUMMARY OF THE INVENTION

The present invention has been made to solve the above problem and relates to a coordinate input technique capable of improving the operability in coordinate input.

According to the present invention, the foregoing object is attained by providing a coordinate input apparatus which calculates a pointed position on a coordinate input region, comprising:

calculation means for detecting the pointed position and calculating coordinates of the pointed position;

determination means for determining a region on the coordinate input region, to which the coordinates calculated by the calculation means belong; and generation means for generating pen-down information corresponding to the pointed position on the basis of the region to which the coordinates belong and which is determined by the determination means.

In a preferred embodiment, the coordinate input region includes a pen input region where input for drawing a locus on a screen or moving a cursor on the screen can be executed and a switch input region where input of switch information can be executed.

In a preferred embodiment, the apparatus further comprises light-receiving means arranged at a corner portion of the coordinate input region, reflection means, arranged at a peripheral portion of the coordinate input region, for retroreflecting incident light, and light-emitting means for illuminating the coordinate input region with light, wherein the calculation means calculates angle information corresponding to a point which crosses a predetermined level in a light amount distribution obtained from the light-receiving means and calculates the coordinates of the pointed position on the basis of the angle information.

In a preferred embodiment, the apparatus further comprises proximity information generation means for generating proximity information representing whether a detected pointed state is in a proximity of the coordinate input region, on the basis of a change amount between a light amount distribution obtained from the light-receiving means in an initial state and a light amount distribution obtained from the light-receiving means in a coordinate input sampling state.

In a preferred embodiment, the coordinate input region includes a first region where the pen-down information is generated by using the proximity information as a first criterion and a second region where the pen-down information is generated on the basis of a second criterion different from the first criterion.

In a preferred embodiment, the apparatus further comprises switch information detection means for detecting switch information from a pointer having a switch function, wherein the second criterion is the switch information.

In a preferred embodiment, the second criterion is a change ratio between the light amount distribution obtained from the light-receiving means in the initial state and the light amount distribution obtained from the light-receiving means in the coordinate input sampling state.

In a preferred embodiment, the coordinate input region includes a pen input region where input for drawing a locus on a screen or moving a cursor on the screen can be executed and a switch input region where input of switch information can be executed, the pen input region corresponding to the second region, and the switch input region corresponding to the first region.

In a preferred embodiment, when pointing input is executed continuously from the pen input region to the switch input region, the switch input region is caused to function as the second region.

According to the present invention, the foregoing object is attained by providing an information processing apparatus which has a coordinate input unit which calculates a pointed position on a coordinate input region, a display unit which is integrated with the coordinate input unit, and a display control unit which processes various kinds of information including information output from the coordinate input unit and controls the display unit, comprising:

calculation means for detecting the pointed position and calculating coordinates of the pointed position;

determination means for determining a region on the coordinate input region, to which the coordinates calculated by the calculation means belong; and generation means for generating pen-down information corresponding to the pointed position on the basis of the region to which the coordinates belong and which is determined by the determination means.

According to the present invention, the foregoing object is attained by providing a control method of a coordinate input apparatus which calculates a pointed position on a coordinate input region, comprising:

a calculation step of detecting the pointed position and calculating coordinates of the pointed position;

a determination step of determining a region on the coordinate input region, to which the coordinates calculated in the calculation step belong; and a generation step of generating pen-down information corresponding to the pointed position on the basis of the region to which the coordinates belong and which is determined in the determination step.

According to the present invention, the foregoing object is attained by providing a program which implements control of a coordinate input apparatus which calculates a pointed position on a coordinate input region, comprising:

a program code for a calculation step of detecting the pointed position and calculating coordinates of the pointed position;

a program code for a determination step of determining a region on the coordinate input region, to which the coordinates calculated in the calculation step belong; and a program code for a generation step of generating pen-down information corresponding to the pointed position on the basis of the region to which the coordinates belong and which is determined in the determination step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A and 3B are views showing an arrangement example of the light projecting unit of the sensor unit according to the first embodiment of the present invention;

FIG. 14 is a graph for explaining the light amount change amount and light amount change ratio in the light amount distribution obtained by the sensor unit according to the first embodiment of the present invention;

DETAILED DESCRIPTION OF THE PREFERRED EMBODIMENTS

Preferred embodiments of the present invention will be described in detail in accordance with the accompanying drawings.

First Embodiment

Figure 1:
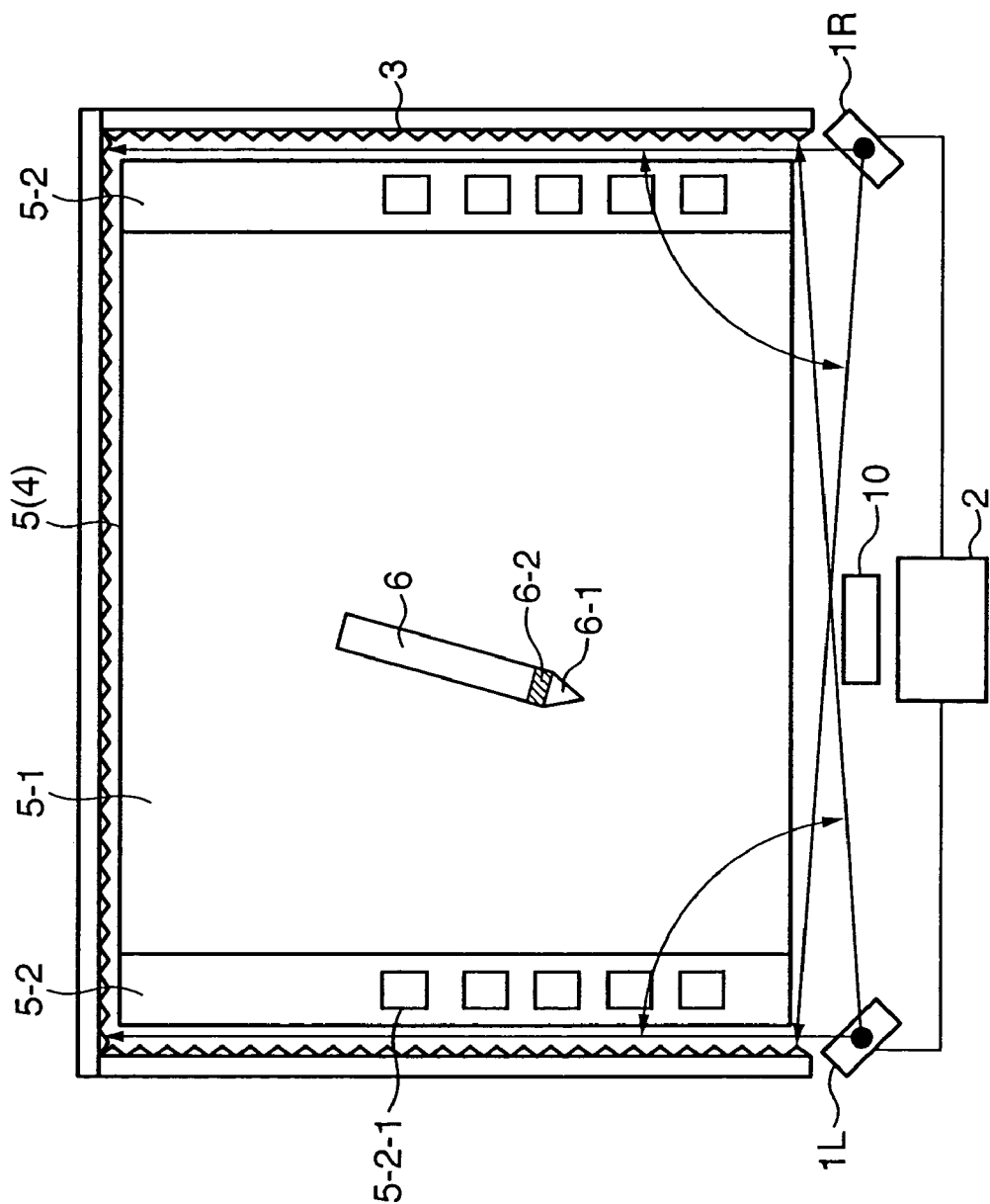
FIG. 1 is a view showing the schematic arrangement of a coordinate input apparatus according to the first embodiment of the present invention.

FIG. 1 is a view showing the schematic arrangement of a coordinate input apparatus according to the first embodiment of the present invention.

Figure 5:
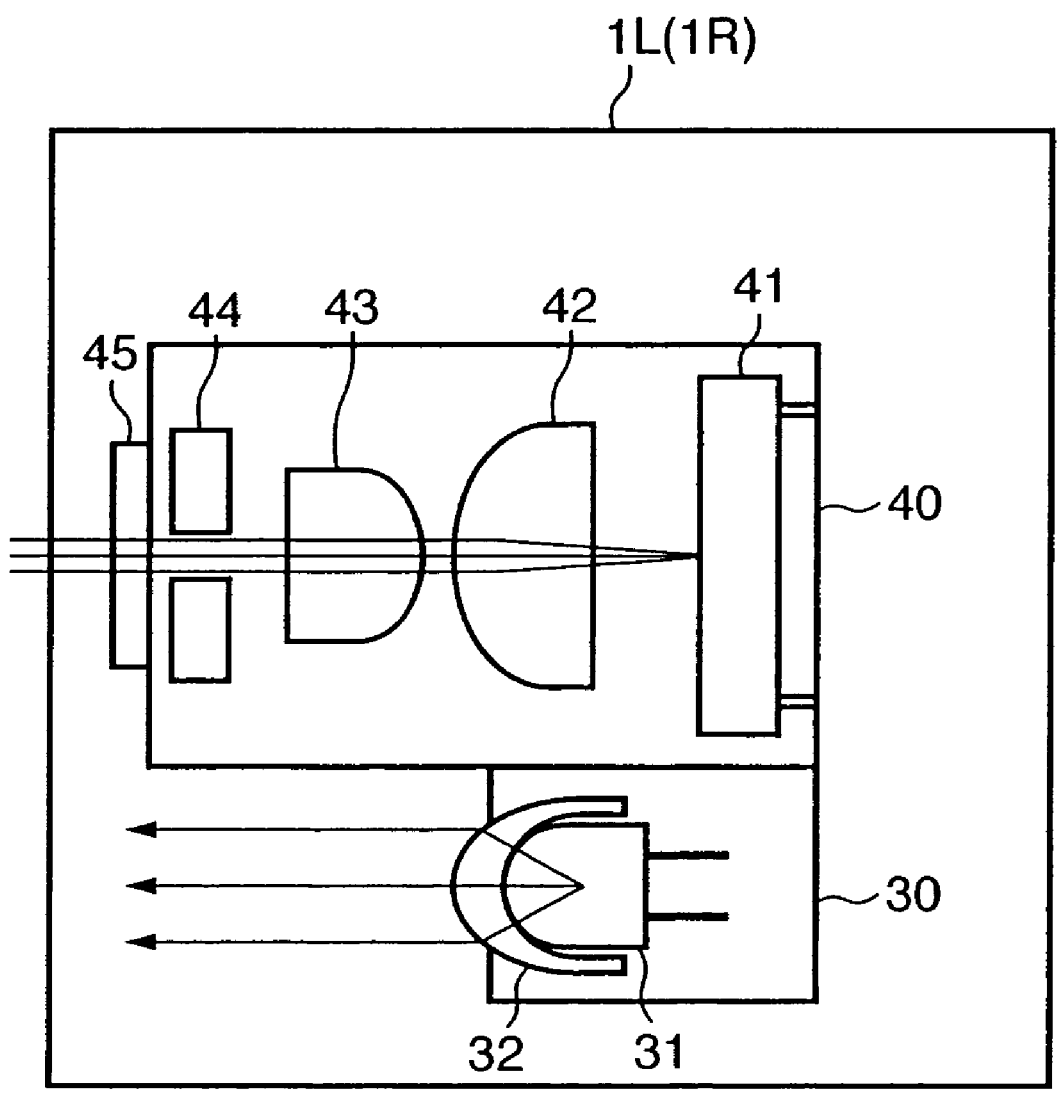
FIG. 5 is a view showing an arrangement example of the sensor unit according to the first embodiment of the present invention.

Referring to FIG. 1, each of sensor units 1L and 1R has a light projecting unit 30 and a detection unit 40 (FIG. 5). The sensor units 1L and IR are separated by a predetermined distance. The sensor units 1L and IR are connected to a control/arithmetic unit 2 which executes a control/arithmetic operation to receive control signals from the control/arithmetic unit 2 and transmit detected signals to the control/arithmetic unit 2.

Figure 2:
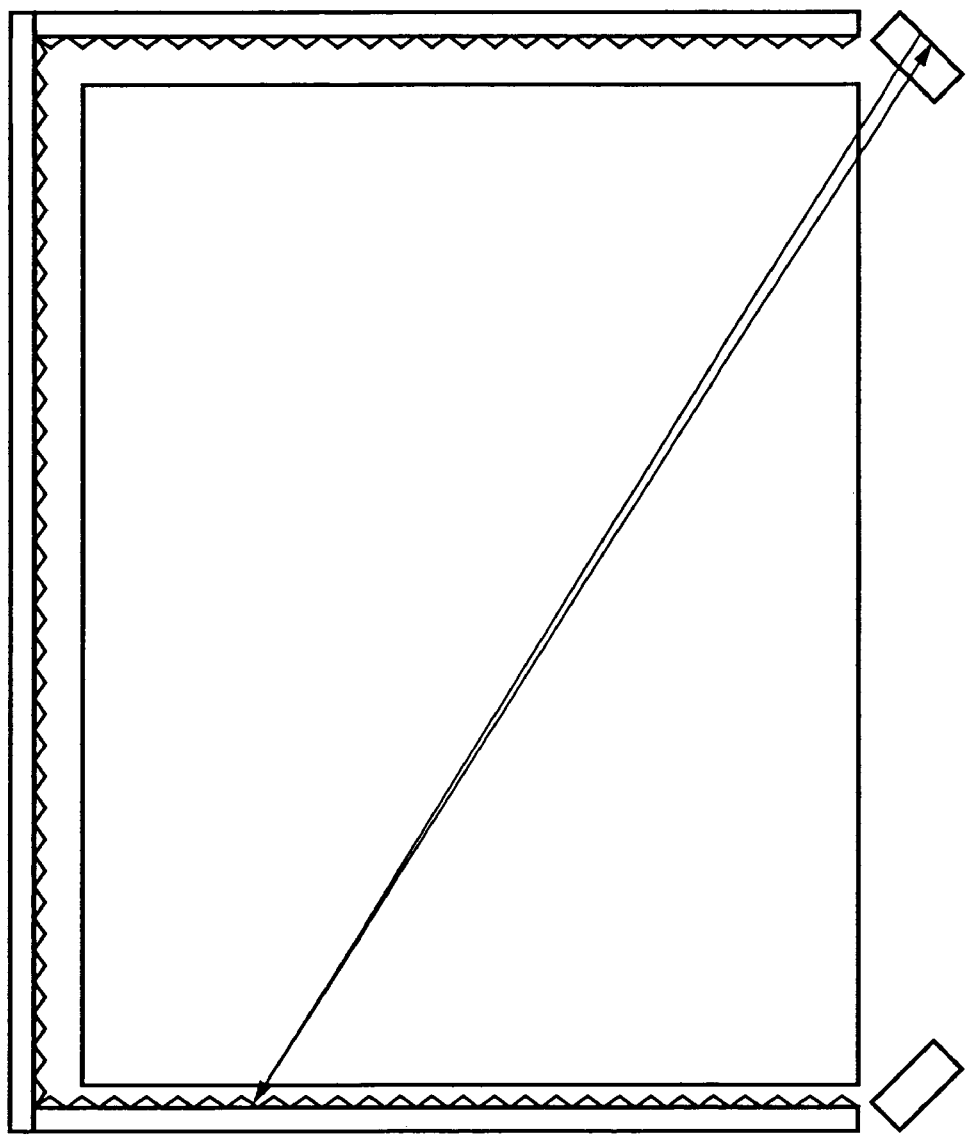
FIG. 2 is a view for explaining the operation of the retroreflecting member according to the first embodiment of the present invention.

A retroreflecting member 3 has a retroreflecting surface which reflects incident light to the arrival direction, as shown in FIG. 2. The retroreflecting member 3 retroreflects light projected from the sensor units 1L and 1R on the left and right sides within a range of about 90° toward the sensor units 1L and 1R. The reflected light is one-dimensionally detected by each of the sensor units 1L and 1R. The light amount distribution is transmitted to the control/arithmetic unit 2.

A coordinate input region 5 includes a display screen 4 of a display device such as a PDP, rear projector, or LCD panel and can be used as an interactive input device.

In the first embodiment, as shown in FIG. 1, the coordinate input region 5 includes a pen input region 5-1 where drawing, character input, or cursor pointing input is mainly done by using a pointer 6 (an input region where input can be done to draw a locus on the display screen 4 or move the cursor on the display screen 4) and a switch input region 5-2 where switch information is touch-input not only by the pointer 6 having a switch actuating function but also by a finger.

The pattern of the switch input region 5-2 is formed by printing or the like to discriminate it from the pen input region 5-1. The switch input region 5-2 includes a plurality of sub-switch input regions 5-2-1 to implement a plurality of kinds of switch functions.

As described above, in the first embodiment, examples of the pointing means for inputting coordinates to the coordinate input region 5 are a finger, pen, and dedicated pointer. In the following description, the pointing means will generally be called the pointer 6, if there is no special necessity.

In this arrangement, when input pointing by the pointer 6 is done in the coordinate input region 5, light projected from the light projecting units 30 of the sensor units 1L and 1R is shielded. Since reflected light by the retroreflecting member 3 is not obtained, no reflected light amount is obtained at only the input pointed position.

The control/arithmetic unit 2 detects the light-shielded range of the portion input-pointed by the pointer 6 from the light amount change detected by the sensor units 1L and 1R. The control/arithmetic unit 2 specifies the detection point in the light-shielded range and calculates the angles of the pointer 6 with respect to the sensor units 1L and 1R. On the basis of the calculated angles and the distance between the sensor units, the control/arithmetic unit 2 calculates the pointing position of the pointer 6 on the coordinate input region 5 and outputs it as coordinate information.

The pointer 6 comprises a tip portion 6-1 having a pen point switch actuating means which executes a switch operation upon contacting the coordinate input region 5 and a light-emitting portion 6-2 which converts switch information from the pen point switch means from an electrical signal to an optical pulse signal such as infrared and sends it at a predetermined period.

The optical pulse signal from the light-emitting portion 6-2 is detected by a light-receiving sensor unit 10 arranged independently of the sensor units 1L and 1R. The detection signal is transmitted to the control/arithmetic unit 2.

In the first embodiment, the detection signal transmission to the control/arithmetic unit 2 can be done not by an infrared signal but by an optical signal in another wavelength range. Not the optical transmission means but a radio wave means or ultrasonic wave means may be used. The optical pulse signal from the light-emitting portion 6-2 may be coded by a specific pulse sequence and transmitted. The tip portion 6-1 of the pointer 6 functions as a pen point switch means and also serves as a light-shielding portion which shields reflected light by the retroreflecting member 3 in coordinate input. Hence, the shape (thickness and length) of the tip portion 6-1 is so defined as to ensure a sufficient light-shielding range.

In the coordinate input apparatus according to the first embodiment, not only coordinate information obtained from the angles of the pointer 6 with respect to the sensor units 1L and 1R but also pen information by pen-down/pen-up can be output. The pen information corresponds to a data format which is widely adapted to a terminal such as a personal computer (PC) which receives a coordinate command output from, e.g., a mouse. Especially, pen-down is a signal corresponding to left button click on a mouse.

That is, when only coordinate information is output, the cursor moves but the command corresponding to the cursor position is not selected in the pen-up state. Only after the pen-down state is set, the command is selected, as is known. In drawing a character locus or the like by using the pointer 6, the locus drawing can be executed in the pen-down state.

As a characteristic feature of the first embodiment, pen information (especially pen-down information) in coordinate input pointing is generated on the basis of a criterion that changes depending on a region on the coordinate input region to which pointed position belongs when coordinates are input by the pointer 6. This will be described later in detail.

The coordinate values of the generated coordinate information and pen information are output to an external terminal such as a personal computer connected to the display screen 4 through an interface such as a USB. The coordinate values need not always be output to an external terminal. The control/arithmetic unit 2 may process various kinds of information including not only the coordinate information and pen information but also proximity information (to be described later) and output the information to a display control device that controls the display device 4. The display control device may generate pen information in coordinate input pointing on the basis of the criterion that changes depending on the region on the coordinate input region to which coordinate information belongs.

The external terminal has standard constituent elements mounted in a general-purpose computer (e.g., a CPU, RAM, ROM, hard disk, external storage device, network interface, display, keyboard, and mouse).

As described above, the external terminal can be operated by the pointer 6 by drawing a line on the screen or operating an icon by using the cursor displayed on the display device 4.

<Detailed Description of Sensor Unit>

The arrangement of the light projecting unit 30 in each of the sensor units 1L and 1R will be described first with reference to FIGS. 3A and 3B.

FIGS. 3A and 3B are views showing an arrangement example of the light projecting unit of the sensor unit according to the first embodiment of the present invention.

FIG. 3A shows the light projecting unit 30 viewed from the upper side (from a direction perpendicular to the input surface of the coordinate input region 5). An infrared LED 31 emits infrared light. The light emitted from the infrared LED 31 is projected in a range of about 90° by a light projecting lens 32.

FIG. 3B shows the light projecting unit 30 viewed from a side (from a direction parallel to the input surface of the coordinate input region 5). In this direction, the light from the infrared LED 31 is projected as a light beam limited in the vertical direction so that the light is mainly projected to the retroreflecting member 3.

The arrangement of the detection unit 40 in each of the sensor units 1L and 1R will be described next with reference to FIG. 4.

Figure 4:
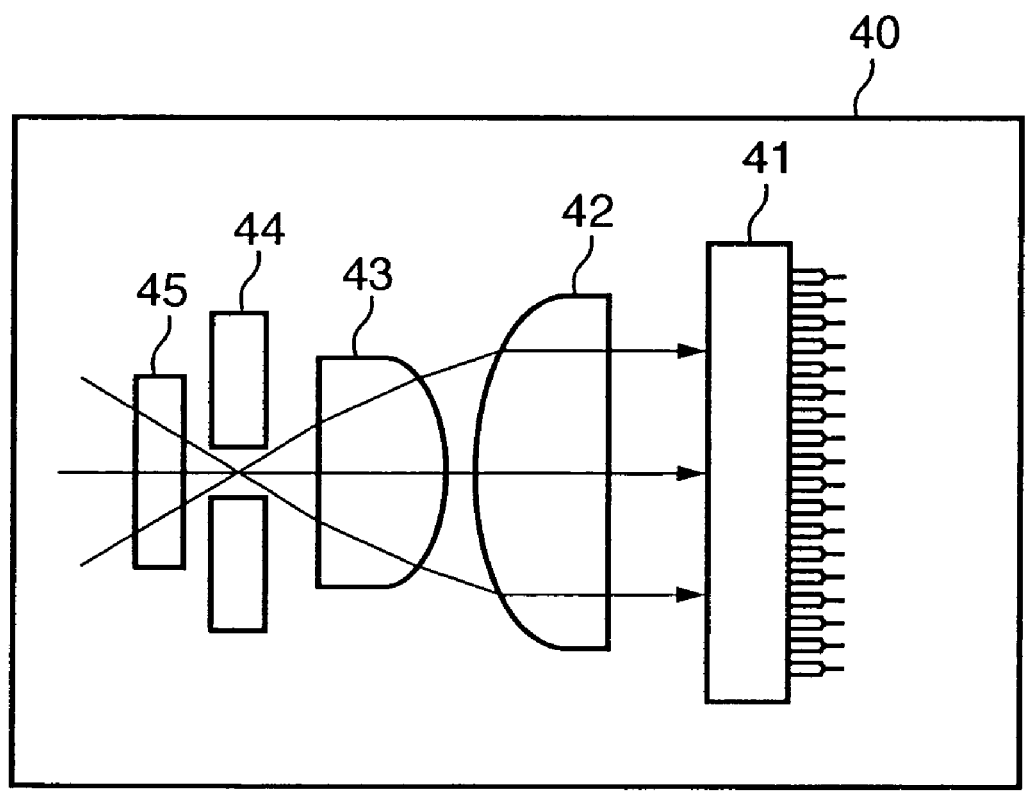
FIG. 4 is a view showing an arrangement example of the detection unit of the sensor unit according to the first embodiment of the present invention.

FIG. 4 is a view showing an arrangement example of the detection unit of the sensor unit according to the first embodiment of the present invention.

FIG. 4 shows the detection unit 40 in each of the sensor units 1L and 1R from a direction perpendicular to the input surface of the coordinate input region 5.

The detection unit 40 includes a one-dimensional line CCD 41 including a plurality of light-receiving elements (pixels), condenser lenses 42 and 43 serving as a condenser optical system, a stop 44 which limits the direction of incidence of incident light, and an infrared filter 45 which prevents incidence of extra light such as visible light.

Light from the light projecting unit 30 is reflected by the retroreflecting member 3 and passes through the infrared filter 45 and stop 44. An image of light in the range of about 90° on the input surface is formed on pixels of the detection surface of the line CCD 41 depending on the incident angle by the condenser lenses 42 and 43. This makes it possible to obtain a light amount distribution for each incident angle. That is, the pixel numbers of pixels of the line CCD 41 represent angle information.

The arrangement of each of the sensor units 1L and 1R each having the light projecting unit 30 shown in FIGS. 3A and 3B and the detection unit 40 shown in FIG. 4 will be described next with reference to FIG. 5.

FIG. 5 is a view showing an arrangement example of the sensor unit according to the first embodiment of the present invention.

FIG. 5 shows the sensor unit 1L (1R) in which the light projecting unit 30 shown in FIG. 3A and the detection unit 40 shown in FIG. 4 are stacked and viewed from the direction parallel to the input surface. The distance between the optical axis of the light projecting unit 30 and that of the detection unit 40 is set to a sufficiently detectable range on the basis of the angle characteristic of the retroreflecting member 3.

<Reflecting Member>

Figure 6:
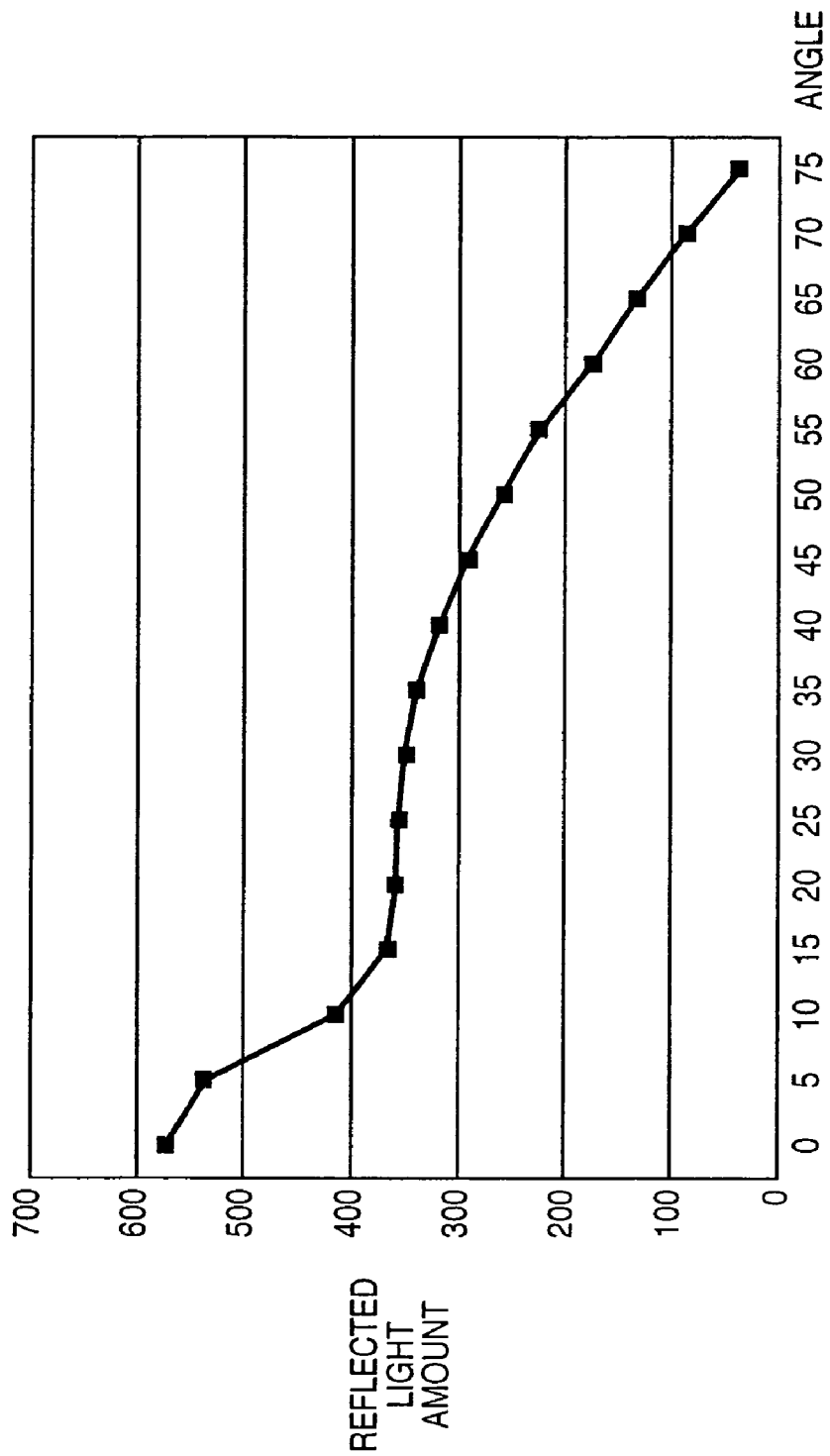
FIG. 6 is a graph showing the retroreflection characteristic for an incident angle to the retroreflecting member according to the first embodiment of the present invention.

The retroreflecting member 3 has a reflecting characteristic to an incident angle. As the reflecting characteristic, for example, when the retroreflecting member 3 has a flat tape shape, the reflected light amount decreases nearly when the incident angle of incident light on the retroreflecting member 3 exceeds 45°, as shown in FIG. 6. When the pointer 6 is present, the change in light amount cannot sufficiently be ensured.

The reflected light amount is determined by the light amount distribution (illumination intensity and distance), the reflectance of the retroreflecting member 3 (incident angle and reflecting member width), and the imaging system illuminance in the sensor units 1L and 1R (cosine fourth law).

To solve a shortage of reflected light amount, the illumination intensity of the light projecting unit 30 is increased. However, when the reflected light amount distribution is not uniform, and light of a large light amount portion is received by the sensor unit, that portion may be saturated in the line CCD 41 in the sensor unit. Hence, there is a limitation on the increase in illuminance intensity. In other words, when the reflected light amount distribution of the retroreflecting member 3 is made as uniform as possible, the increase in reflected light amount to a small light amount portion can be expected.

Figure 7:
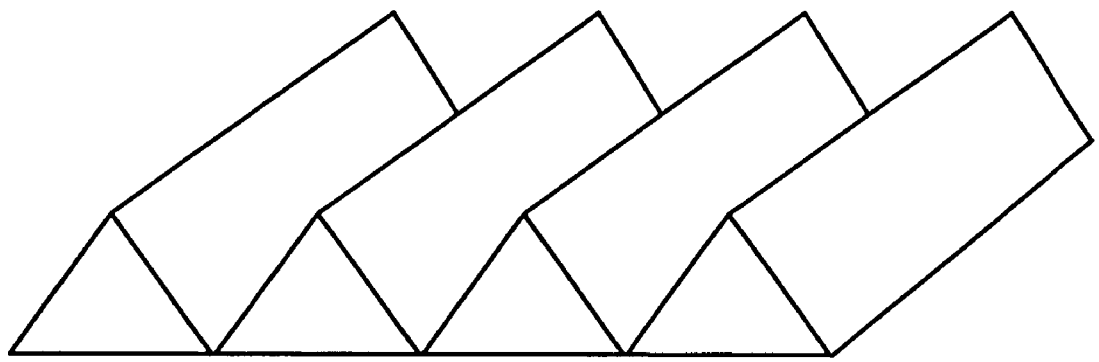
FIG. 7 is a view showing an arrangement example of the retroreflecting member according to the first embodiment of the present invention.

In the first embodiment, to uniform the reflected light amount of incident light on the retroreflecting member 3 to the incident angle direction, a retroreflecting member including a plurality of triangular prisms as shown in FIG. 7 is used. Accordingly, the reflecting characteristic to the incident angle can be improved.

The angle of each triangular prism is determined from the reflecting characteristic of the retroreflecting member. The pitch of the triangular prisms is preferably set to be equal to or less than the detection resolution of the line CCD 41 in the sensor unit.

<Description of Control/Arithmetic Unit>

The control/arithmetic unit 2 and each of the sensor units 1L and 1R mainly exchange a CCD control signal, a CCD clock signal, and an output signal for the line CCD 41 in the detection unit 40 and a driving signal for the infrared LED 31 of the light projecting unit 30.

The detailed arrangement of the control/arithmetic unit 2 will be described with reference to FIG. 8.

Figure 8:
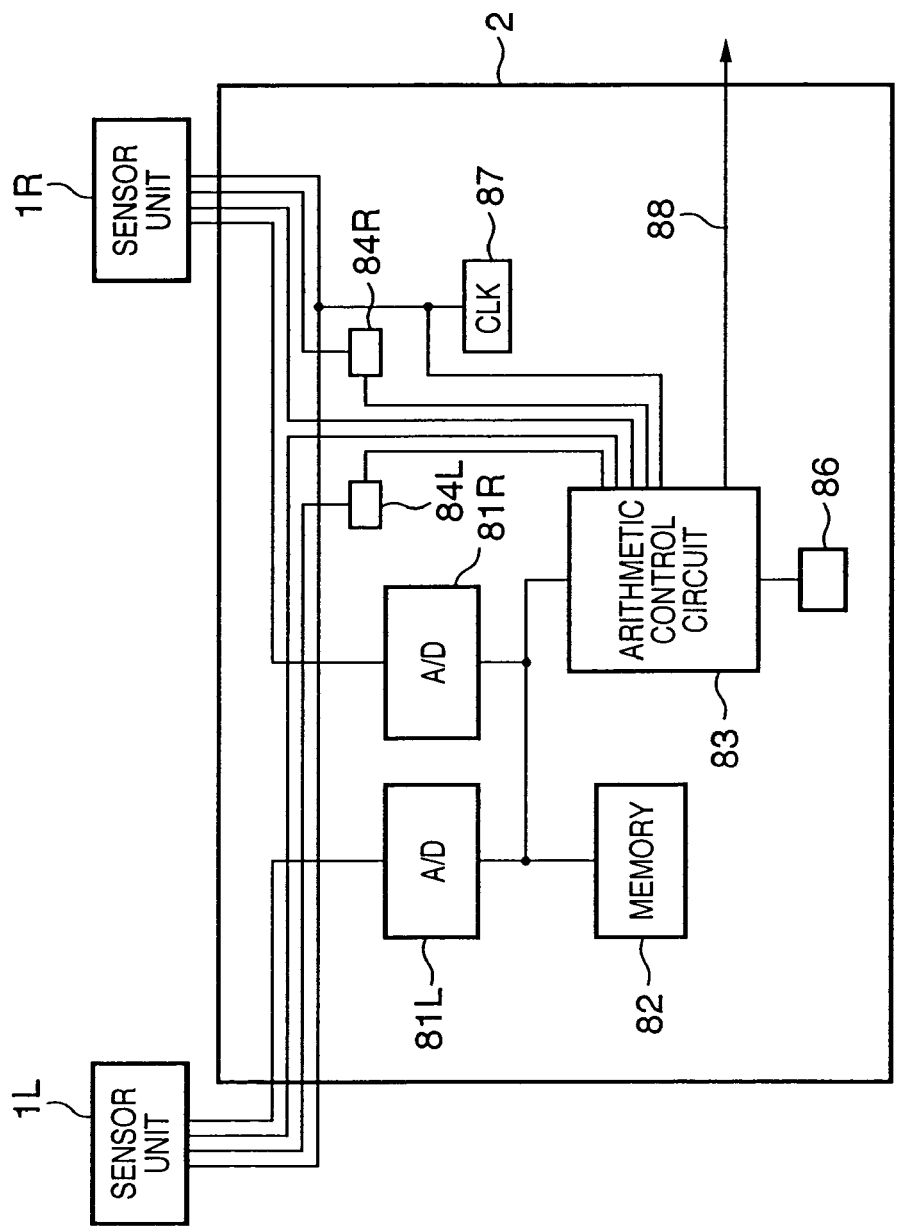
FIG. 8 is a block diagram showing the detailed arrangement of the control/arithmetic unit according to the first embodiment of the present invention.

FIG. 8 is a block diagram showing the detailed arrangement of the control/arithmetic unit according to the first embodiment of the present invention.

The CCD control signal is output from an arithmetic control circuit (CPU) 83 including a one-chip microcomputer or the like to control the shutter timing of the line CCD 41 or execute data output control.

The arithmetic control circuit 83 operates in accordance with a clock signal from a main clock generation circuit 86. A CCD clock signal is transmitted from a clock generation circuit (CLK) 87 to the sensor units 1L and 1R and also input to the arithmetic control circuit 83 to execute various kinds of control in synchronism with the line CCD 41 in each sensor unit.

An LED driving signal to drive the infrared LED 31 in each light projecting unit 30 is supplied from the arithmetic control circuit 83 to the infrared LED 31 of a corresponding one of the sensor units 1L and 1R through an LED driving circuit 84L or 84R.

A detection signal from the line CCD 41 in the detection unit 40 of each of the sensor units 1L and 1R is input to a corresponding one of the A/D converters 81L and 81R of the control/arithmetic unit 2 and converted into a digital value under the control of the control/arithmetic unit 2. The converted digital value is stored in a memory 82 and used for angle calculation for the pointer 6. Coordinate values are calculated from the calculated angle and output to an external terminal through a serial interface 88 (e.g., a USB or RS232C interface).

<Description of Light Amount Distribution Detection>

Figure 9:
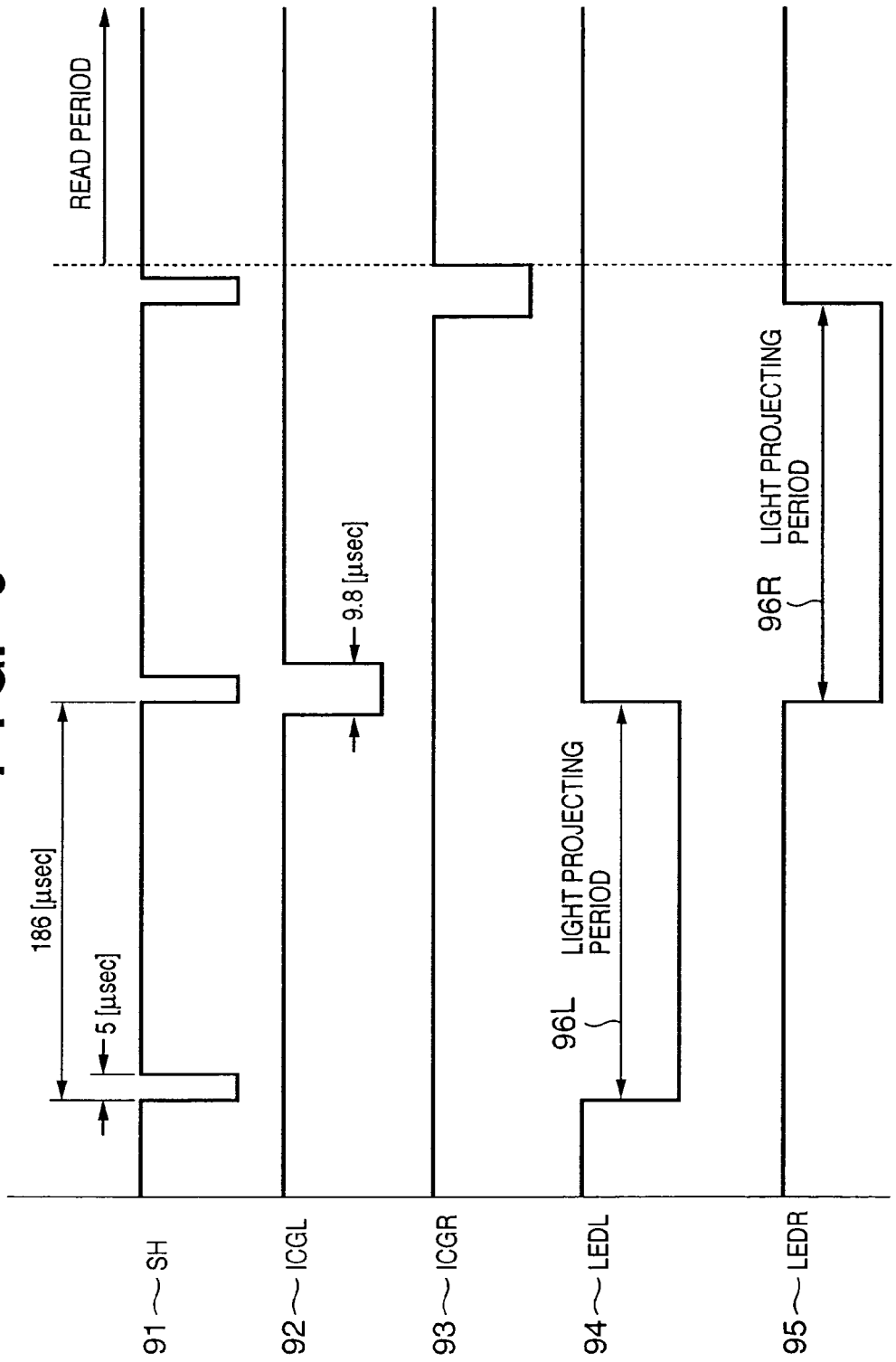
FIG. 9 is a timing chart of control signals according to the first embodiment of the present invention.

FIG. 9 is a timing chart of control signals according to the first embodiment of the present invention.

Referring to FIG. 9, reference numerals 91 to 93 denote CCD control signals. The shutter release time of the line CCD 41 is determined by the interval of the SH signal 91. The ICGL signal 92 and ICGR signal 93 are gate signals to the sensor units IL and 1R. Each of the signals transfers charges in the photoelectric conversion unit of the line CCD 41 to the read unit.

Reference numerals 94 and 95 denote driving signals for the light projecting units 30 of the sensor units 1L and 1R. To turn on the light projecting unit 30 of the sensor unit iL at the first period of the SH signal 91 (light projecting period 96L), the LEDL signal 94 is supplied to the light projecting unit 30 through the LED driving circuit 84L. To turn on the light projecting unit 30 of the sensor unit 1R at the next period of the SH signal 91 (light projecting period 96R), the LEDR signal 95 is supplied to the light projecting unit 30 through the LED driving circuit 84R.

After driving of the light projecting units 30 in both the sensor units 1L and 1R is ended, detection signals from the detection units (line CCDs 41) of both the sensor units 1L and IR are read out.

Figure 10:
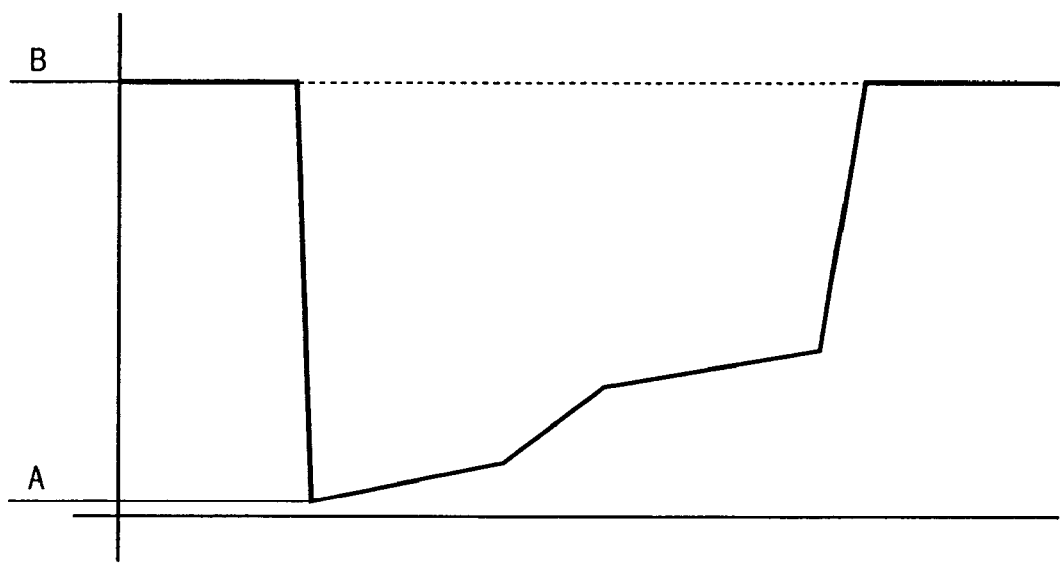
FIG. 10 is a graph showing an example of the light amount distribution obtained by the sensor unit according to the first embodiment of the present invention.

When input by the pointer 6 to the coordinate input region 5 is not executed, the detection signals read out from both the sensor units 1L and 1R have a light amount distribution shown in FIG. 10 as the outputs from the sensor units. Such a light amount distribution is not always obtained in all systems. The light amount distribution changes depending on the characteristic of the retroreflecting member 3, the characteristic of the light projecting unit 30, or a change over time (e.g., dirt on the reflecting surface).

Referring to FIG. 10, a level A is the maximum light amount, and a level B is the minimum light amount.

More specifically, when no reflected light is obtained from the retroreflecting member 3, the light amount level obtained by the sensor units 1L and 1R is almost the level B. As the reflected light amount increases, the light amount level is transited to the level A. Detection signals thus output from the sensor units 1L and 1R are A/D-converted by the A/D converters 81L and 81R and received by the control/arithmetic unit 2 as digital data.

Figure 11:
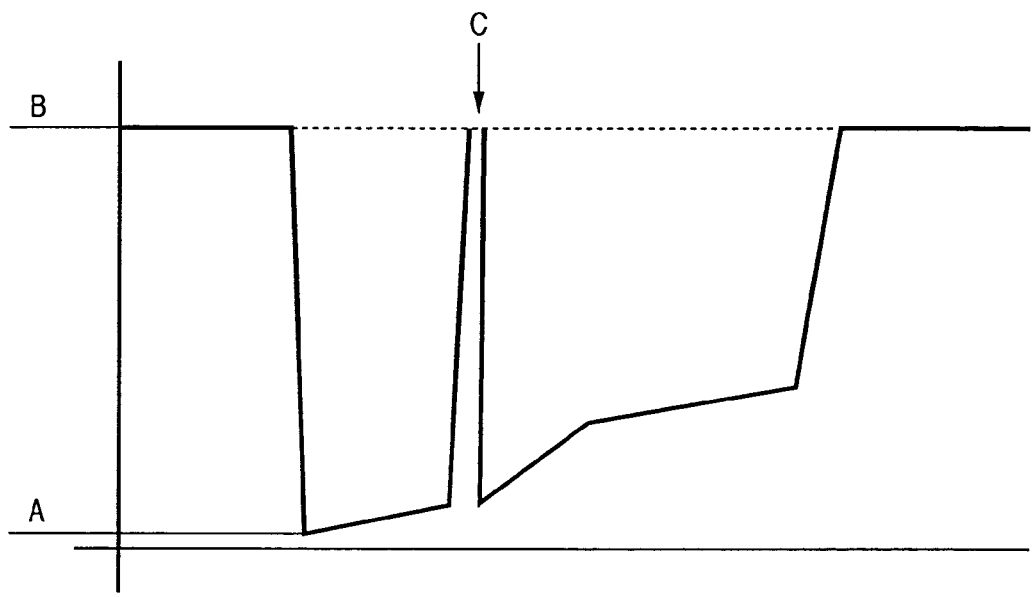
FIG. 11 is a graph showing an example of the light amount distribution obtained by the sensor unit when input according to the first embodiment of the present invention is done.

To the contrary, when input by the pointer 6 to the coordinate input region 5 is executed, a light amount distribution shown in FIG. 11 is obtained as the outputs from the sensor units 1L and 1R.

Reflected light from the retroreflecting member 3 is shielded by the pointer 6 at a portion C of the light amount distribution. As is apparent from FIG. 11, the reflected light amount decreases at only that portion (light-shielded range).

In the first embodiment, the angles of the pointer 6 with respect to the sensor units 1L and 1R are calculated on the basis of the change between the light amount distribution shown in FIG. 10 when input by the pointer 6 is not executed and the light amount distribution shown in FIG. 11 when input by the pointer 6 is executed.

More specifically, the light amount distribution shown in FIG. 10 is stored in the memory 82 as an initial state in advance. It is detected on the basis of the difference between the light amount distribution during the sample period and that in the initial state whether the change in light amount distribution as shown in FIG. 11 is obtained during the sample period of the detection signal of each of the sensor units 1L and 1R. If the light amount distribution has changed, calculation to determine the input angle is executed by using the change portion as the input point of the pointer 6.

<Description of Angle Calculation>

In calculating the angles of the pointer 6 with respect to the sensor units 1L and 1R, the light-shielded range by the pointer 6 must be detected first.

As described above, the light amount distribution detected by each of the sensor units 1L and 1R is not constant because of factors such as a change over time. The light amount distribution in the initial state is preferably stored in the memory 82, e.g., every time the system is activated. Accordingly, except a case wherein, e.g., the retroreflecting surface of the retroreflecting member 3 is dusty and cannot completely reflect light, the light amount distribution in the latest initial state of the coordinate input apparatus can be managed in the memory 82.

Angle calculation of the pointer 6 by one of the sensor units 1L and 1R (e.g., the sensor unit 1L) will be described below. The same angle calculation is executed by the other sensor unit (sensor unit 1R), as a matter of course.

At the time of power-on, in a state without input and in a state wherein light projection from the light projecting unit 30 in the sensor unit 1L is stopped, the light amount distribution as the output from the detection unit 40 is A/D-converted. The value is stored in the memory 82 as Bas_data[N].

This value is data containing a bias variation or the like of the detection unit (line CCD 41) and is present near the level B in FIG. 10. N indicates the pixel number of a pixel of the line CCD 41. Pixel numbers corresponding to the effective input range (effective range) are used.

Next, in a state wherein light projection from the light projecting unit 30 is executed, the light amount distribution as the output from the detection unit 40 is A/D-converted. The value is stored in the memory 82 as Ref_data[N].

This value is, e.g., data indicated by the solid line in FIG. 10.

Using Bas_data[N] and Ref_data[N] stored in the memory 82, the presence/absence of input by the pointer 6 and the presence/absence of a light-shielded range are determined.

The pixel data of an nth pixel during the sample period of the output of the sensor unit IL (line CCD 41) is indicated by Norm_data[N].

First, to specify the light-shielded range, the presence/absence of a light-shielded range is determined on the basis of the absolute amount of a change in pixel data. This processing is done in order to prevent any determination error by noise and detect a proper change in predetermined amount.

More specifically, the absolute amount of a change in pixel data is calculated in each pixel of the line CCD 41 and compared with a threshold value Vtha determined in advance.

$$\text{Norm\_data\_}a[N] = \text{Norm\_data}[N] - \text{Ref\_data}[N] \qquad (1)$$

where Norm_data_a[N] is the absolute change amount in each pixel of the line CCD 41.

In this processing, the absolute change amount Norm_data_a[N] in each pixel of the line CCD 41 is only calculated and compared with the threshold value Vtha. Hence, no long processing time is necessary, and the presence/absence of input can be determined at a high speed. Especially., when the number of pixels whose change amounts are more than the threshold value Vtha exceeds a predetermined number, it is determined that input by the pointer 6 is present.

Figure 12:
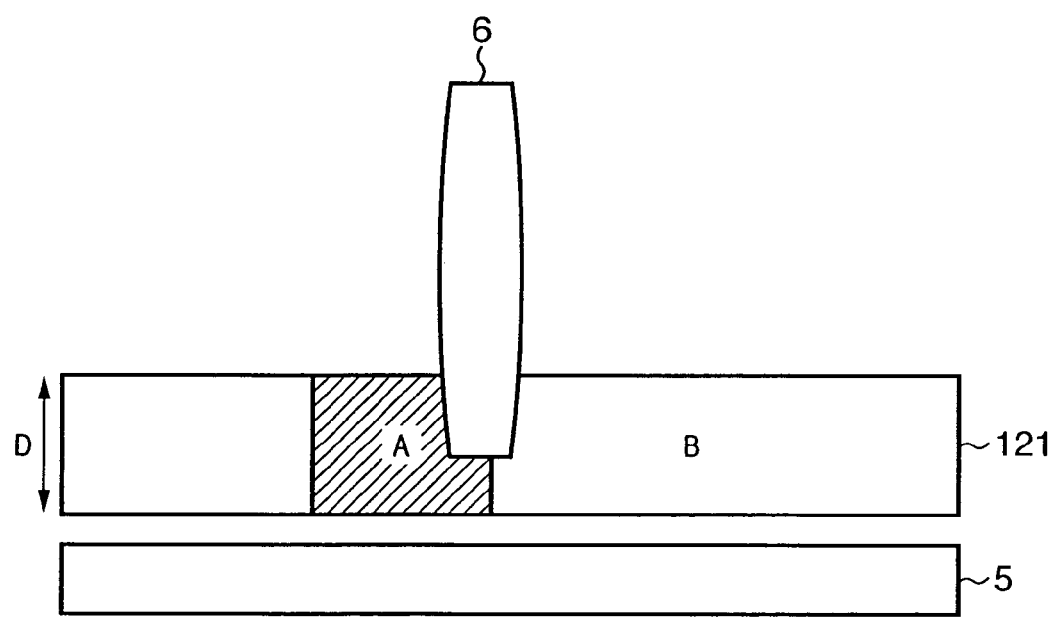
FIG. 12 is a view for explaining an input example of the first embodiment of the present invention.

By this determination, proximity information representing whether the pointer 6 is in the proximity of the coordinate input region 5 can be determined (to be described later). Referring to FIG. 12, reference numeral 121 denotes a retroreflecting surface of the retroreflecting member 3. A width D of the retroreflecting surface 121 is almost a light beam region to be light-shielded by the pointer 6.

Hence, as the tip of the pointer 6 comes close to the coordinate input region 5, Norm_data_a[N] becomes large. When the distance between the tip of the pointer 6 and the coordinate input region 5 is equal to or smaller than a predetermined distance, it is determined that the value exceeds the threshold value Vtha, and input is present. This state is defined as a proximity state in which the pointer 6 is in the proximity of the coordinate input region 5, and input is being executed. The proximity information is set to IN that represents the proximity state (proximity).

The minimum distance between the tip of the pointer 6 and the coordinate input region 5, which is more than the threshold value Vtha, is a proximity distance. When the threshold value Vtha becomes small, the proximity distance becomes large, and the proximity input range becomes wide, though the influence of noise increases. More strictly, the value Norm_data_a[N] affects the light-shielded area by the pointer 6. The value affects not only the distance between the tip of the pointer 6 and the input surface of the coordinate input region 5 but also the shape, size, and thickness of the pointer 6. However, since the shape of the pointer 6 has a predetermined value (even when a finger is used as the pointer 6, the individual difference between fingers also falls within a predetermined range), the relationship between the threshold value Vtha and the proximity distance holds under the same conditions.

When the proximity input range is wide, the input state is maintained even if the pointer 6 is slightly separated from the input surface of the coordinate input region 5 in the input operation by the pointer 6. For this reason, when the proximity information is used as pen information representing the pen-down state in drawing, e.g., a character locus, the information may be insensitive to the distance in the height direction from the input surface of the coordinate input region 5, resulting in trouble in the coordinate input operation.

Hence, as will be described below, a criterion to generate pen information sensitive to the distance in the height direction from the coordinate input surface must separately be prepared. When the threshold value Vtha is made large, noise resistance characteristic improves, though the proximity distance becomes small. It is suitable for a switch operation for input using only a finger. However, a cursor moving operation by a conventional mouse operation is impossible, resulting in a decrease in operability.

In the first embodiment, the threshold value Vtha is used in pen input determination as the criterion coordinate calculation start. This value is set to a sufficiently large value in consideration of noise so that the proximity distance poses no problem in operation. Whether the determination result based on the threshold value Vtha is to be used as pen information representing the pen-down state is determined on the basis of the region on the coordinate input region 5 to which the input coordinates belong.

A method will be described next with reference to FIG. 12 in which to more accurately detect input by the pointer 6, an input point is determined by calculating the change ratio of pixel data.

Figure 13:
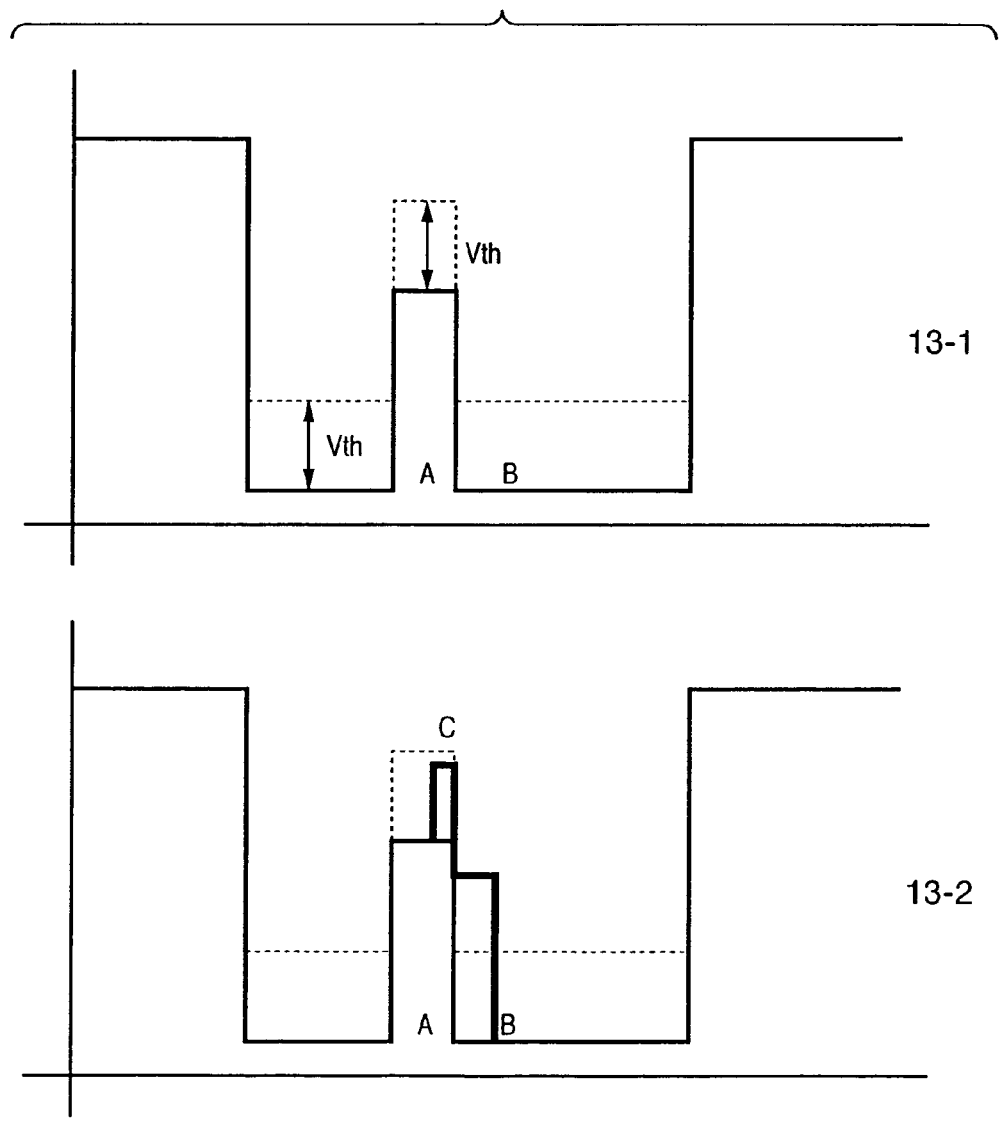
FIG. 13 is a graph for explaining a change in light amount in the light amount distribution obtained by the sensor unit according to the first embodiment of the present invention.

Referring to FIG. 12, reference numeral 121 denote the retroreflecting surface of the retroreflecting member 3. Assume that the reflectance in a region A is low because of dirt or the like. As for the pixel data distribution (light amount distribution) of Ref_data[N] at this time, the reflected light amount is small at a portion corresponding to the region A. When the pointer 6 is inserted and almost covers the upper half portion of the retroreflecting surface 121 in this state, as shown in FIG. 12, the reflected light amount is almost halved. Hence, Norm_data[N] indicated by the bold line in 13-2 in FIG. 13 is observed.

When equation (1) is applied to this state, the pixel data distribution is indicated by 14-1 in FIG. 14. The ordinate represents the differential voltage from the initial state.

When the threshold value Vtha is applied to this pixel data, it may be impossible to detect the actual input range. When the threshold value Vtha is made small, the input range can be detected to some extent, though there may be the influence of noise.

To prevent this, the pixel data change ratio is calculated. In both the region A and a region B, the reflected light amount is ½ that in the initial state. Hence, the ratio can be calculated by $$Norm\_data\_r[N]=Norm\_data\_a[N]/(Bas\_data[N]-Ref\_data[N]) \quad (2)$$

From this calculation result, the change in pixel data is represented by a ratio, as in 14-2 in FIG. 14. Even when the reflectance of the retroreflecting member 3 changes, the same processing can be executed, and the input can accurately be detected.

A threshold value Vthr is applied to the pixel data. Pixel numbers corresponding to the leading edge and trailing edge of the pixel data distribution corresponding to the light-shielded range are acquired. A central point between the two pixels is defined as the pixel corresponding to the input by the pointer 6. Accordingly, the input position of the pointer 6 can more accurately be determined.

The distribution 14-2 in FIG. 14 is a schematic illustration for a descriptive convenience. Such a leading edge cannot be obtained in fact, and the respective pixels exhibit different data levels.

Details of a detection result obtained by applying equation (2) to the pixel data will be described next with reference to FIG. 15.

Figure 15:
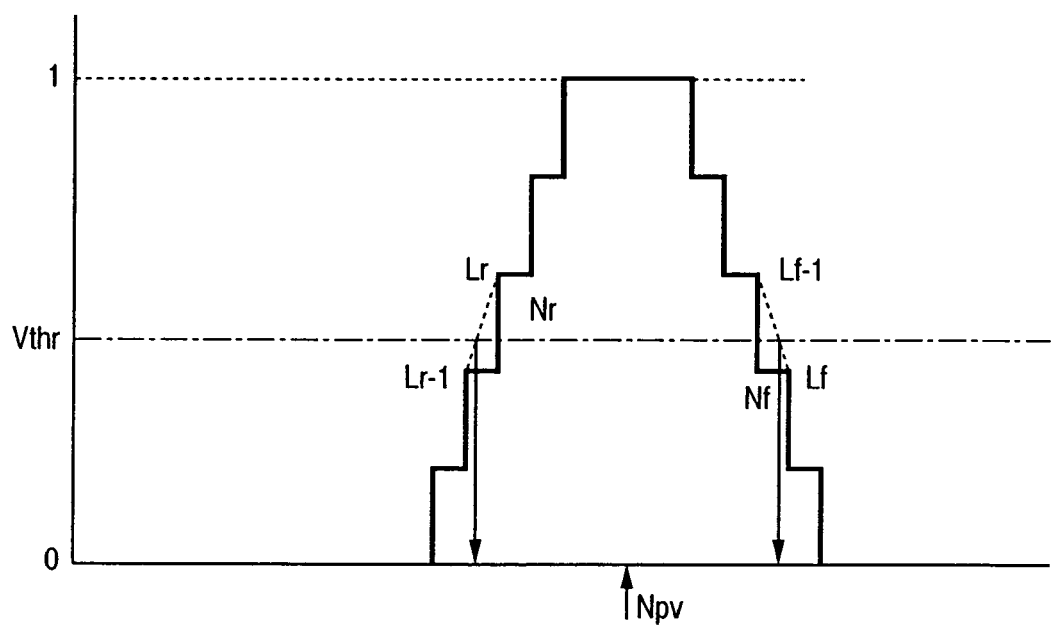
FIG. 15 is a graph showing a light-shielded range detection example of the first embodiment of the present invention.

FIG. 15 is a graph showing details of a detection result according to the first embodiment of the present invention.

Referring to FIG. 15, the threshold value Vthr is set to detect the light-shielded range by the pointer 6. The leading edge portion of the pixel data distribution that crosses the threshold value Vthr indicates the Nrth pixel. The trailing edge portion indicates the Nfth pixel. At this time, a central pixel Np between the pixels is given by $$Np=Nr+(Nf-Nr)/2 \quad (3)$$

In this calculation, however, the pixel interval corresponds to the minimum resolution.

To more finely detect the light-shielded range, virtual pixel numbers which cross the threshold value Vthr are calculated by using the data level of each pixel and that of an immediately preceding adjacent pixel.

Let Lr be the data level of the Nrth pixel, Lr−1 be the data level of the (Nr−1)th pixel, Lf be the data level of the Nfth pixel, and Lf−1 be the data level of the (Nf−1)th pixel. Virtual pixel numbers Nrv and Nfv are given by $$Nrv=Nr-1+(Vthr-Lr-1)/(Lr-Lr-1) \quad (4)$$

$$Nfv=Nf-1+(Vthr-Lf-1)/(Lf-Lf-1) \quad (5)$$

A virtual central pixel Npv between the virtual pixel numbers Nrv and Nfv is given by $$Npv=Nrv+(Nfv-Nrv)/2 \quad (6)$$

As described above, when virtual pixel numbers which cross the threshold value Vthr are calculated on the basis of the pixel numbers of pixels having data levels more than the threshold value Vthr, adjacent pixel numbers, and their data levels, detection with a higher resolution can be implemented.

The threshold value Vthr may be used to determine the presence/absence of pen-down (to be described later).

To calculate the actual coordinate values of the pointer 6 from the pixel number representing the central point of the light-shielded range obtained in the above-described manner, the central pixel number must be converted into angle information.

In actual coordinate calculation processing to be described later, it is more convenient to obtain the value of tangent at that angle than the angle itself.

The pixel number is converted into tan θ by looking up a table or using transformation. Especially, when the optical system in the detection unit 40 has no aberration, linear transformation can be used. If aberration is present, the error of aberration can be removed by using a polynomial of higher degree.

The relationship between a pixel number and tan θ will be described with reference to FIG. 16.

Figure 16:
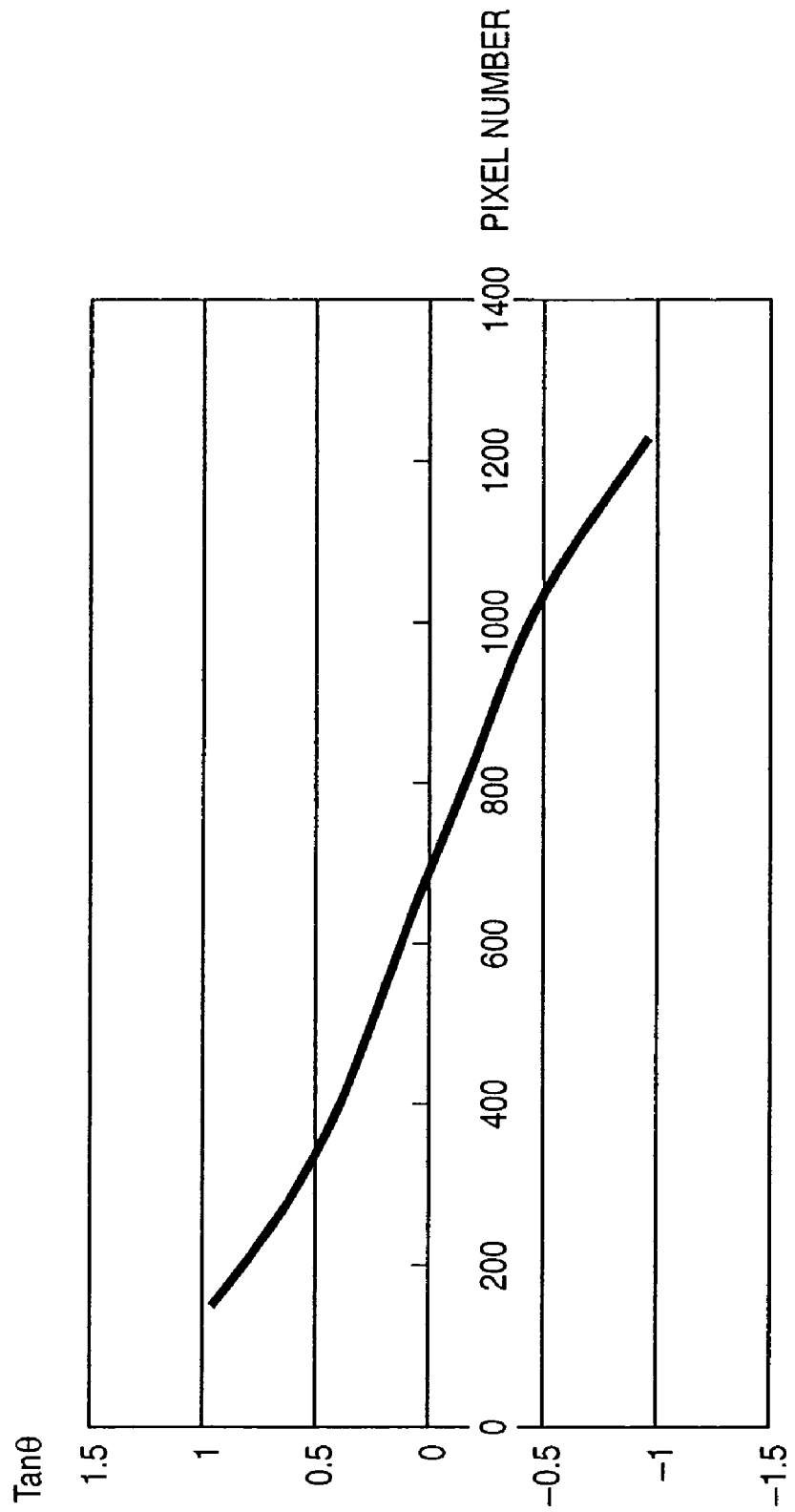
FIG. 16 is a graph showing the relationship between a value tan θ and a pixel number in the first embodiment of the present invention.

FIG. 16 is a graph showing the relationship between a value tan θ and a pixel number in the first embodiment of the present invention.

On the basis of FIG. 16, an approximate expression to obtain tan θ from a pixel number is defined. A pixel number can be converted into tan θ by using the approximate expression (transformation).

As the transformation, a polynomial of higher degree is used, the accuracy can be ensured. The degree of the polynomial is determined in consideration of the calculation capability and accuracy specifications of the coordinate input apparatus.

For, e.g., a quintic polynomial, six coefficients are necessary. The coefficient data are stored in the memory 82 at the time of shipment.

Letting L5, L4, L3, L2, L1, and L0 be the coefficients of the quintic polynomial, tan θ is given by $$\tan\theta=(L5*Npr+L4)*Npr+L3)*Npr+L2)*Npr+L1)*Npr+L0 \quad (7)$$

When this calculation is executed for each pixel number detected by the line CCD 41 in the detection unit 40 of each of the sensor units 1L and 1R, corresponding angle data (tan θ) can be determined. In the above example, tan θ is obtained directly from the pixel number. Instead, the angle itself may be obtained from the pixel number first, and then, tan θ may be obtained.

<Description of Coordinate Calculation Method>

The position coordinates of the pointer 6 are calculated from the angle data (tan θ) converted from the pixel number.

The positional relationship between the sensor units 1L and 1R and coordinates defined on the coordinate input region 5 will be described with reference to FIG. 17.

Figure 17:
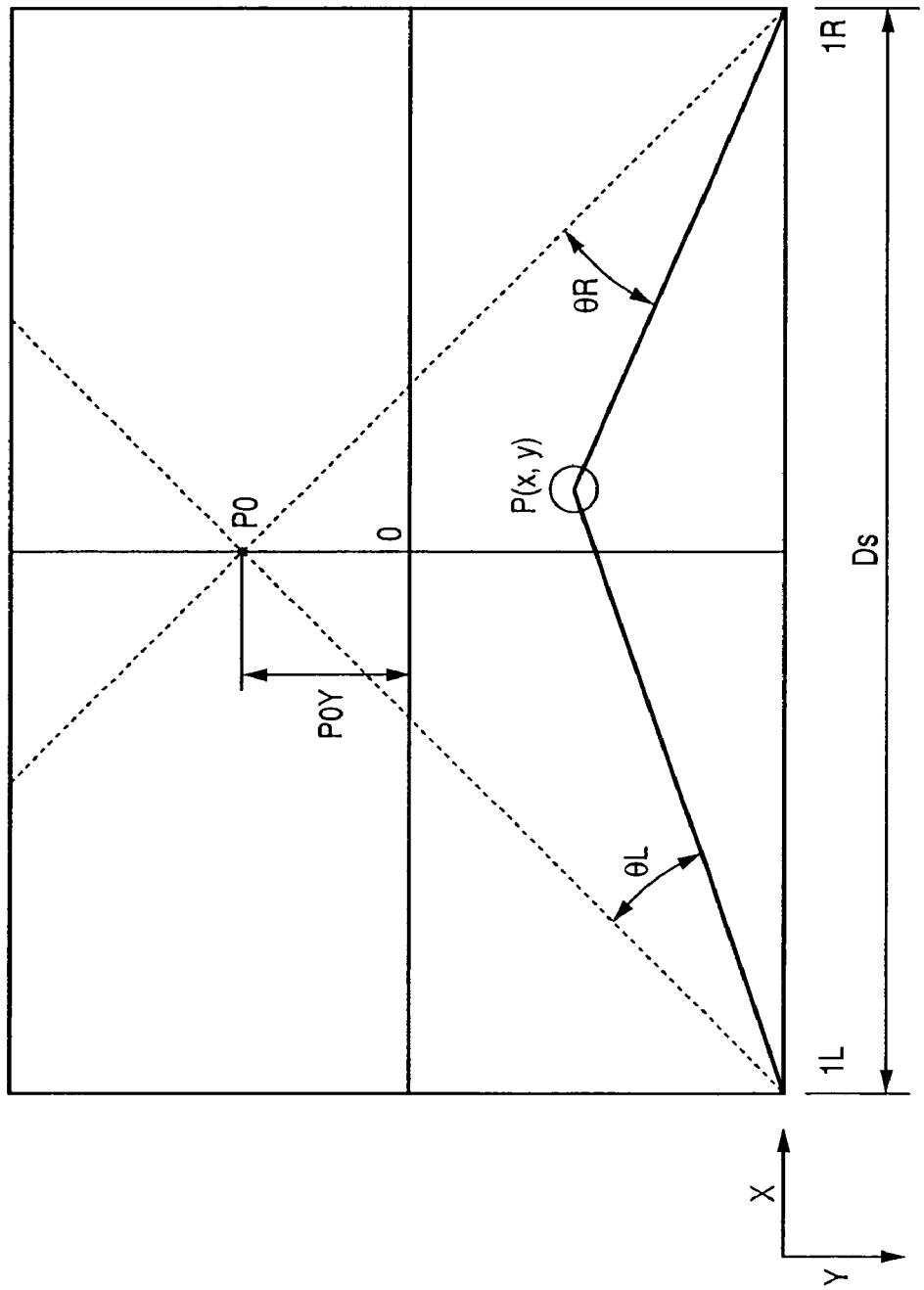
FIG. 17 is a view showing the positional relationship between the sensor units 1L and 1R and coordinates defined on the coordinate input region in the first embodiment of the present invention.

FIG. 17 is a view showing the positional relationship between the sensor units 1L and 1R and coordinates defined on the coordinate input region in the first embodiment of the present invention.

Referring to FIG. 17, the sensor units 1L and 1R are attached to the left and right of the lower side of the coordinate input range of the coordinate input region 5. The distance between the sensor units is represented by Ds.

The origin position is defined at the center of the coordinate input region 5. P0 is an intersection for the sensor units 1L and 1R at an angle of 0°.

Letting θL and θR be angles of the sensor units 1L and 1R, tan θL and tan θR are calculated by using equation (7).

At this time, the coordinates P(x,y) are given by $$x=Ds*(\tan\theta L+\tan\theta R)/(1+(\tan\theta L*\tan\theta R)) \quad (8)$$

$$y=-Ds*(\tan\theta R-\tan\theta L-(2*\tan\theta L*\tan\theta R))/(1+(\tan\theta L*\tan\theta R))+P0Y \quad (9)$$

The coordinate calculation processing of the coordinate input apparatus based on the above calculation will be described with reference to FIG. 18.

Figure 18:
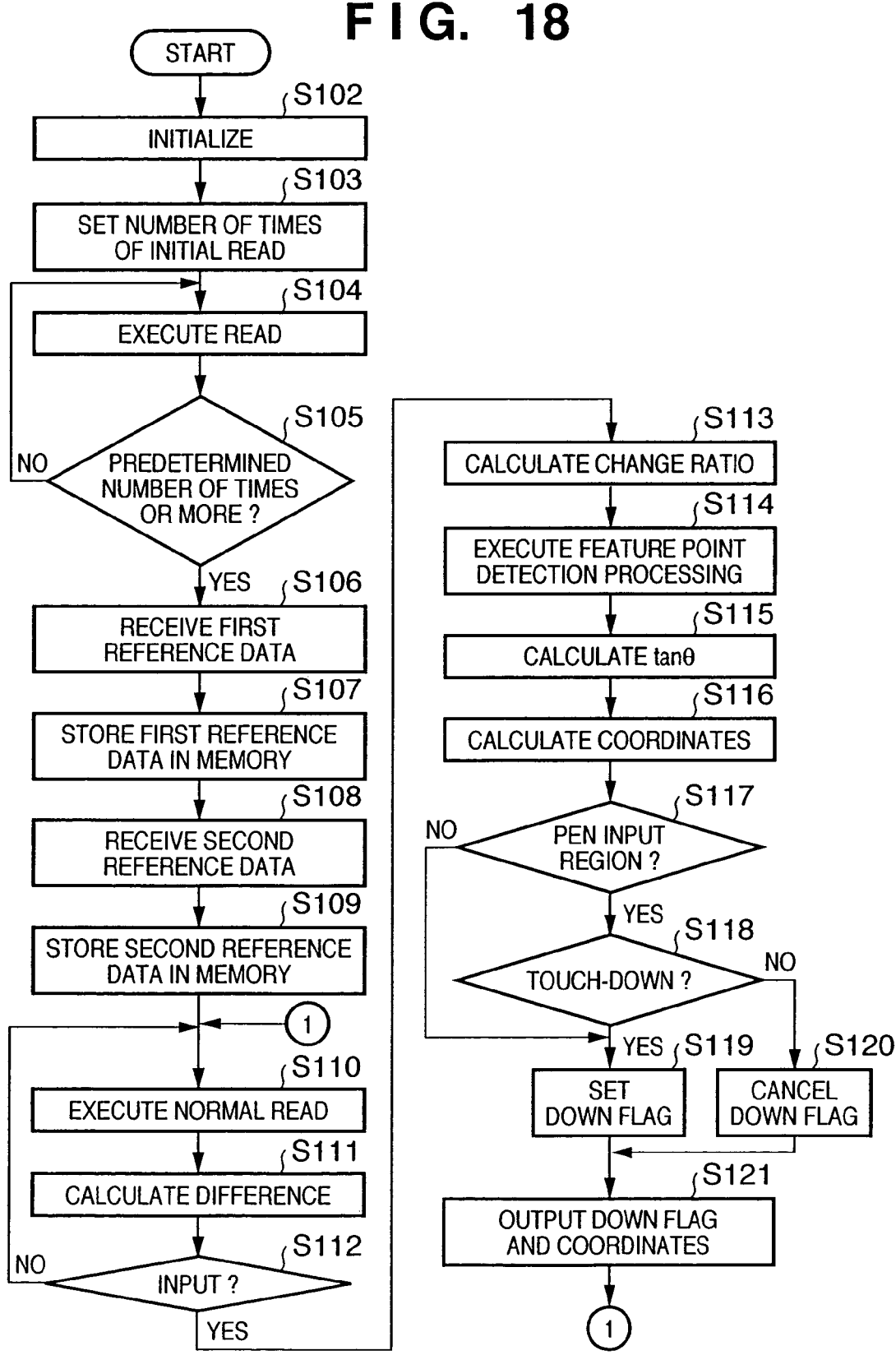
FIG. 18 is a flowchart showing coordinate calculation processing executed by the coordinate input apparatus according to the first embodiment of the present invention.

FIG. 18 is a flowchart showing coordinate calculation processing executed by the coordinate input apparatus according to the first embodiment of the present invention.

When the coordinate input apparatus is powered on, various kinds of initialization operations related to the coordinate input apparatus are executed in step S102, including port setting of the control/arithmetic unit 2 and timer setting.

In step S103, the number of times of initial read for the initial read operation of the line CCD 41 is set.

The initial read operation is an operation to remove unnecessary charges of the line CCD 41 at the time of activation of the coordinate input apparatus. The line CCD 41 sometimes accumulate unnecessary charges in an inoperative state. If the coordinate input operation is executed without removing the charges, detection may be impossible, or a detection error occurs. To avoid this, in step S103, in a state wherein light projection by the light projecting unit 30 is stopped, the read operation is executed a predetermined number of times, thereby removing unnecessary charges.

In step S104, the read operation of the line CCD 41 is executed. In step S105, it is determined whether the read is executed a predetermined number of times or more. If the read is not executed a predetermined number of times or more (NO in step S105), the flow returns to step S104. When the read is executed a predetermined number of times or more (YES in step S105), the flow advances to step S106.

In step S106, the pixel data (Bas_data[N]) of the line CCD 41 in the state wherein light projection by the light projecting unit 30 is stopped is received as first reference data. In step S107, the first reference data is stored in the memory 82.

In step S108, the pixel data (Ref_data[N]) of the line CCD 41 in the state wherein light projection by the light projecting unit 30 is executed is received as second reference data. In step S109, the second reference data is stored in the memory 82.

The above processing is the initial operation at the time of power-on. An operation for the input by the pointer 6 is executed subsequently.

In step S110, in the coordinate input sampling state, the normal read operation of the line CCD 41 is executed to receive pixel data (Norm_data[N]). In step S111, the difference value between the second reference data (Ref_data[N]) and the pixel data (Norm_data[N]) is calculated. In step S112, the presence/absence of input by the pointer 6 is determined on the basis of the difference value and the above-described threshold value Vthr. If no input is detected (NO in step S112), the flow returns to step S110. If input is detected (YES in step S112), the flow advances to step S113.

When the repetitive period at this time is set to about 10 [msec], sampling is executed at 100 times/sec.

In step S113, the pixel data change ratio is calculated by using equation (2).

When it is determined in step S112 that input is present, this determination result means that an actual proximity state is set, as described above. Hence, from this step, coordinate calculation is started. At least even when there is no pen-down state, cursor movement based on the calculated coordinate values occurs.

In step S114, on the basis of the calculated pixel data change ratio, the trailing edge and leading edge of the pixel data distribution corresponding to the light-shielded range by the pointer 6 are detected. By using the detected trailing edge and leading edge and equations (4), (5), and (6), the virtual central pixel number as the center of the light-shielded range is determined.

In step S115, tan θ is calculated from the determined central pixel number and equation (7). In step S116, the input coordinates P(x,y) of the pointer 6 are calculated by using equations (8) and (9).

In step S117, it is determined whether the region to which the calculated input coordinates P(x,y) belong is the pen input region 5-1. This determination is done to determine whether the input coordinates P(x,y) belong to the pen input region 5-1 or switch input region 5-2. If the region to which the input coordinates P(x,y) belong is not the pen input region 5-1 (NO in step S117), the flow advances to step S119. On the other hand, if the region to which the input coordinates P(x,y) belong is the pen input region 5-1 (YES in step S117), the flow advances to step S118.

In step S118, it is determined whether the input by the pointer 6 is touch-down input.

When the proximity state corresponding to a state wherein the cursor is moved without clicking on the button of the mouse and a pen-down (touch-down) state corresponding to a state wherein the left button of the mouse is clicked on are set as the input functions by the pointer 6, the input state by the pointer 6 is determined in step S118.

Especially in the first embodiment, this determination is done by detecting, by the light-receiving sensor unit 10, switch information generated when the tip portion 6-1 of the pointer 6 comes into contact with the coordinate input region 5. Alternatively, when the maximum value of the pixel data change ratio calculated in step S113 is equal to or larger than a predetermined value (e.g., 0.5), the touch-down state may be determined. If the maximum value is smaller than the predetermined value, the proximity state may be determined.

On the basis of this determination method, if it is determined in step S118 that the input by the pointer 6 is touch-down input (YES in step S118), the flow advances to step S119 to set a down flag representing the touch-down input. On the other hand, if the input by the pointer 6 is not touch-down input (NO in step S118), the flow advances to step S120 to cancel the down flag.

According to the processing in steps S117 to S120, when the region to which the input coordinates P(x,y) belong is the pen input region 5-1 that presumes input by the pointer 6, and when the switch of the tip portion 6-1 of the pointer 6 is not operating (not touching the coordinate input region 5), the proximity state is set. When the switch of the tip portion 6-1 of the pointer 6 is operating (touching the coordinate input region 5), the pen-down state is set.

On the other hand, if the region to which the input coordinates P(x,y) belong is the switch input region 5-2 that presumes touch input to a switch (icon), the pen-down state is set when the switch input region 5-2 is pointed, and the proximity state is set. Accordingly, switch operation by a finger can be executed.

When the switch input region 5-2 is pointed by the pointer 6, operation on the switch input region 5-2 is possible independently of the presence/absence of touch by the switch at the tip portion 6-1 of the pointer 6. Hence, both pen input on the pen input region 5-1 and the switch operation on the switch input region 5-2 can be implemented by the same pointer.

In step S121, the down flag state (pen information (pen-down or pen-up)) and the calculated coordinate values are output to an external terminal. In the external terminal, for example, cursor movement or a change of the mouse button state is done on the basis of the received coordinate values and down flag state.

When the processing in step S121 is ended, the flow returns to step S110. The above processing is repeated until power-off.

If it is determined in step S112 that input by the pointer 6 is present, proximity information may be set to IN. The proximity information and coordinate information may be output from the control/arithmetic unit 2 to the display control device of the display device 4. The region to which the coordinate information belongs may be determined here, and it may also be determined on the basis of the proximity information whether the pen-down state is set.

The switch input region 5-2 shown in FIG. 1 has the sub-switch input regions 5-2-1 to which a plurality of kinds of switch functions are assigned. If it is determined in step S117 that the input coordinates P(x,y) belong to the switch input region 5-2, the subswitch input region 5-2-1 to which the input coordinates P(x,y) belong may also be determined. Then, for each determined subswitch input region 5-2-1, it may be determined in accordance with the object or application purpose of each subswitch input region 5-2-1 whether the pen-down state is to be set.

As described above, according to the first embodiment, without causing any switching means such as a changeover switch to switch between the pen input mode by the pointer 6 and the touch (switch) input mode by the pointer 6 or a finger, a coordinate input operation suitable for each of regions to which the input modes are assigned can be implemented.

Accordingly, a coordinate input apparatus can be implemented, which can execute the switch operation even by a pointer such as a finger having no switch means while solving the problem of the insensitive pen-up and pen-down timings in the pen input mode, which is unique to the retroreflective light shielded portion detection method.

Second Embodiment

Figure 19:
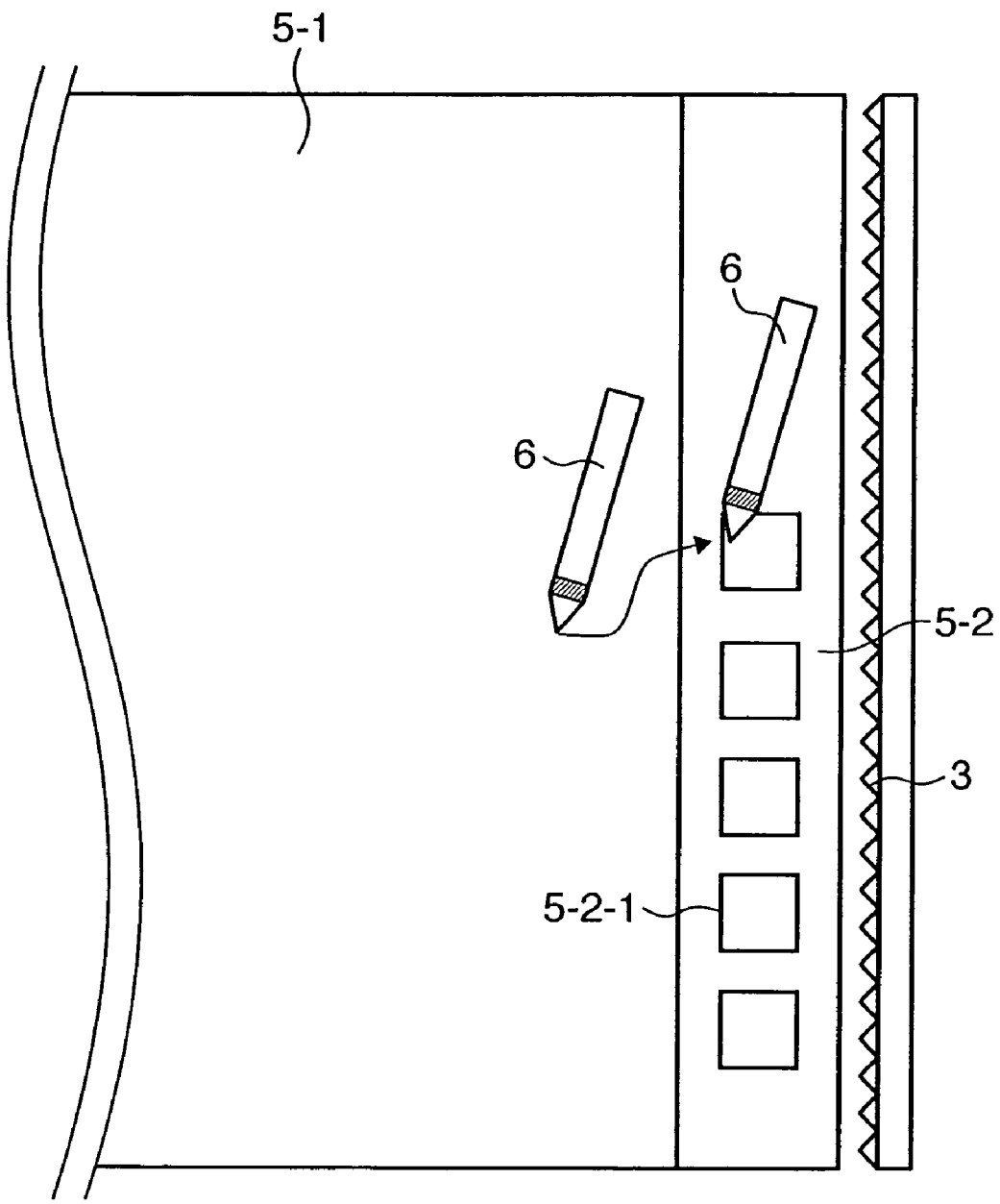
FIG. 19 is a view for explaining the coordinate input operation according to the second embodiment of the present invention.

In the arrangement of the coordinate input apparatus shown in FIG. 1, pointing by the pointer 6 often moves between the pen input region 5-1 and switch input region 5-2, as shown in FIG. 19. In this case, if a pointer 6 moves from a switch input region 5-2 to a pen input region 5-1 continuously (while keeping the proximity (proximity state)), no particular problem is posed. However, in movement in the reverse direction, i.e., when the pointer 6 moves from the pen input region 5-1 to the switch input region 5-2 continuously (while keeping the proximity (proximity state) (including a case wherein the pen-down state is kept), the no-pen-down state in the pen input region 5-1 can abruptly change to the pen-down state in the switch input region 5-2. Such an operation often occurs contrary to the operator's intention and can be expected to result in confusion in operation.

In the second embodiment, coordinate calculation processing capable of executing an appropriate coordinate output operation even when the above-described operation is executed will be described.

Figure 20A:
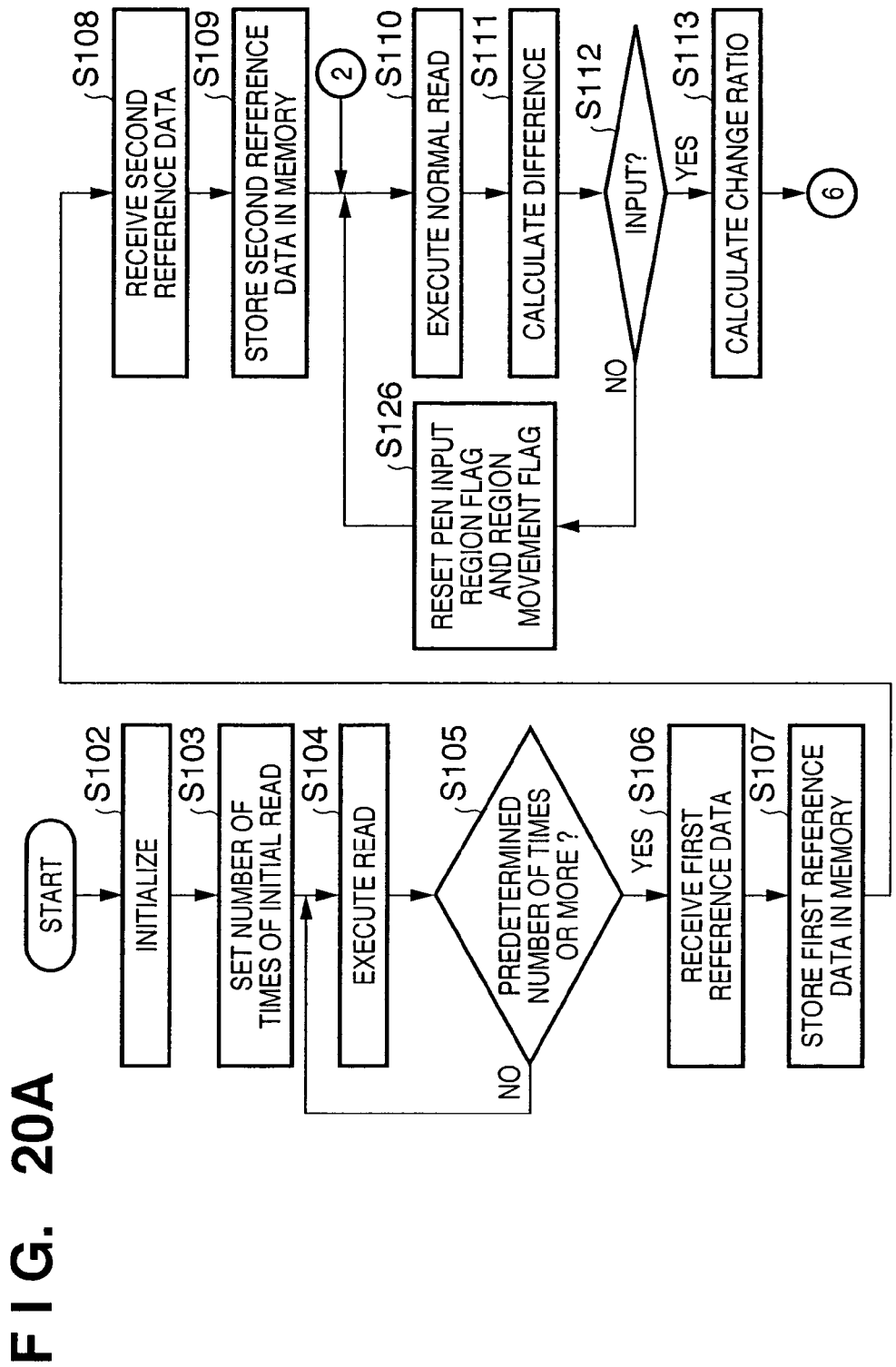
FIGS. 20A and 20B is a flowchart showing coordinate calculation processing executed by the coordinate input apparatus according to the second embodiment of the present invention.
Figure 20B:
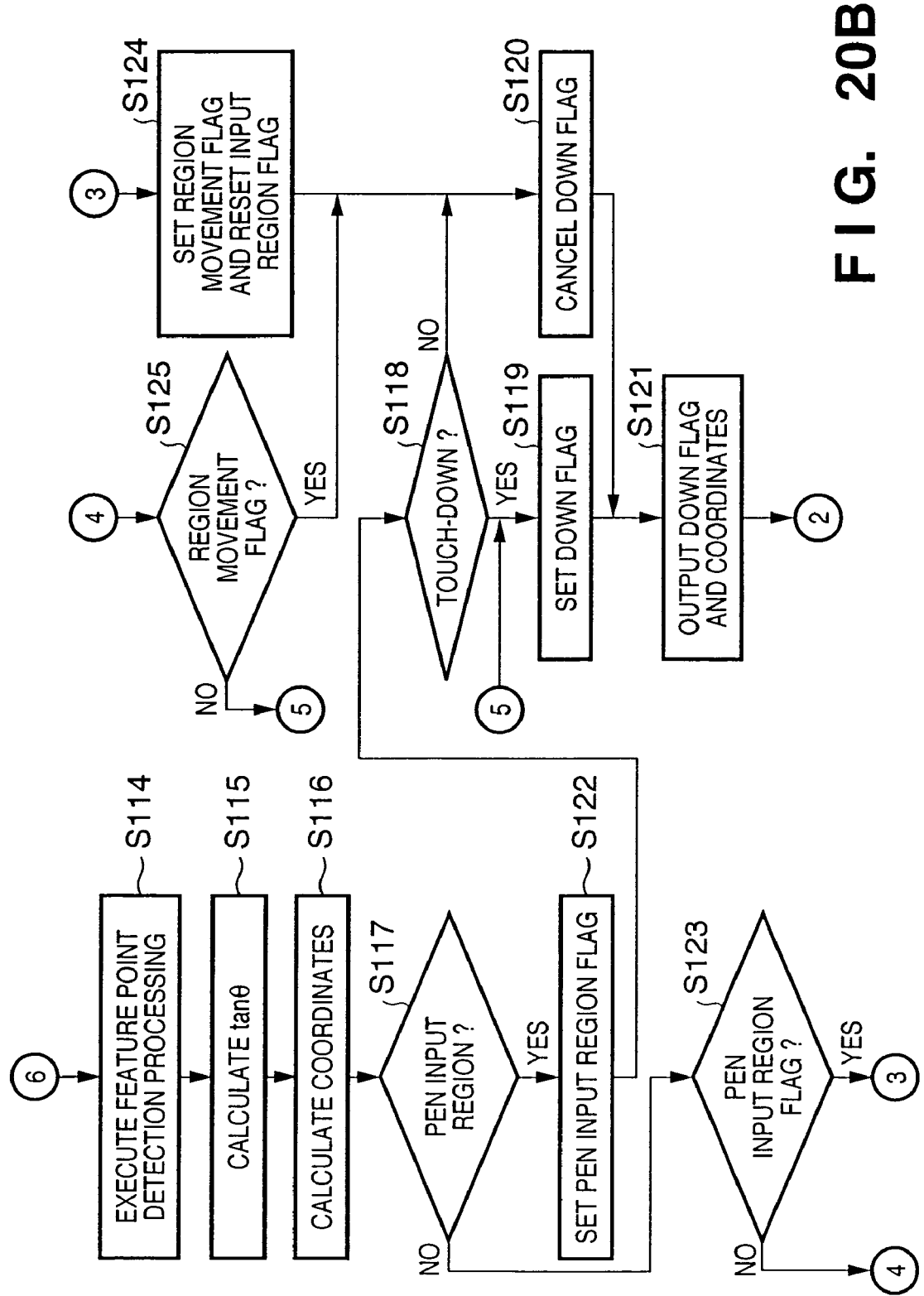

FIGS. 20A and 20B are a flowchart showing coordinate calculation processing executed by the coordinate input apparatus according to the second embodiment of the present invention.

The same step numbers as in the flowchart of the first embodiment shown in FIG. 18 denote the same processing operations in FIGS. 20A and 20B, and a description thereof will be omitted.

If input by the pointer 6 in the pen input region 5-1 is present, it is determined in step S112 that input by the pointer 6 is present, and proximity information is set to IN. After processing in steps S113 to S116 is executed, it is determined in step S117 that the input coordinates by the pen input belong to the pen input region 5-1, and the flow advances to step S122.

In step S122, a pen input region flag representing that the input coordinates belong to the pen input region 5-1 is set. Since it is determined in step S118 that pen input is done, the flow advances to step S119 to set the down flag. Processing in step S121 is executed. Then, the flow returns to step S110.

After the flow returns to step S110, if the input position of pen input moves from the pen input region 5-1 to the switch input region 5-2 continuously (while keeping the proximity state (including a case wherein the pen-down state is kept)), processing in steps S111 to S115 is executed in the same way as described above. However, since it is determined in step S117 that the input coordinates by pen input belong to the switch input region 5-2 (or subswitch input region 5-2-1), the flow advances to step S123.

It is determined in step S123 whether the pen input region flag is set. In the preceding processing, the pen input region flat is set in step S122, and the proximity state is kept since then. Hence, the flow advances to step S124.

In step S124, a region movement flag representing that the proximity is kept is set. Simultaneously, the pen input region flag is reset. The flow advances to step S120 to cancel the down flag. Accordingly, no pen-down state is set on the switch input region 5-2. If the pointer continuously stays in the switch input region 5-2, the flow returns from step S121 to step S110. Processing in steps S111 to S116 is executed.

Since it is determined in step S117 that the input coordinates belong to the switch input region 5-2, the flow advances to step S123. In addition, it is determined in step S123 that the pen input region flag is reset, the flow advances to step S125.

It is determined in step S125 whether the region movement flag is set. In this case, the region movement flag is set in step S124 in the preceding processing, the flow advances to step S120.

That is, assume that the current input coordinates belong to the switch input region 5-2. In this case, when the pointer moves from the pen input region 5-1 to the switch input region 5-2 continuously (while keeping the proximity (proximity state) (including a case wherein the pen-down state is kept), and the state is kept, the region movement flag is always set. Hence, the pen-up state is always set.

When the pointer 6 is temporarily separated from the coordinate input surface by a predetermined distance or more to cancel the proximity (proximity state), the pen input region flag and region movement flag are set in step S126. Since the pen-up state is canceled, pen-down can be executed in the subsequent operation. More specifically, it is determined in step S117 that the region to which the input coordinates belong is the pen input region 5-1. Steps S123 and S125 are executed. The flow advances to step S119 to set the down flag to set the pen-down state.

As described above, according to the second embodiment, when the pointer is moved from the pen input region 5-1 to the switch input region 5-2 continuously (while keeping the proximity (proximity state)), the no-pen-down state in the pen input region 5-1 is inhibited from abruptly changing to the pen-down state, and the pen-up state is always kept. Hence, any operation unintended by the operator can be prevented. Accordingly, the operability in operation between the pen input region 5-1 and the switch input region 5-2 can be improved.

Third Embodiment

In the first or second embodiment, the coordinate input region 5 is divided into two regions, i.e., the pen input region 5-1 and switch input region 5-2. The region to which input coordinates belong is determined, and pen (pen-down) information generation is controlled for each region. However, the present invention is not limited to this.

For example, pen (pen-down) information generation may be controlled for each of a plurality of kinds of subswitch input regions 5-2-1 included in the switch input region 5-2, in addition to the pen input region 5-1 and switch input region 5-2.

In this case, for example, for an operation over three regions, i.e., the pen input region 5-1, switch input region 5-2, and subswitch input region 5-2-1, pen-down information generation is inhibited. However, for an operation from the switch input region 5-2 to the subswitch input region 5-2-1, pen-down information generation may be executed.

Alternatively, the switch input region 5-2 may be set as an intermediate region and reflected on control of pen-down information generation. With this arrangement, even when the pointer erroneously moves from the pen input region 5-1 to the switch input region 5-2, execution of switch input can be prevented. In addition, as for input near the subswitch input region 5-2-1, switch input by continuous input from the subswitch input region 5-2-1 can be executed. Hence, the operability can further be improved.

The embodiments of the present invention have been described above in detail. The present invention can be applied to an embodiment as, e.g., a system, apparatus, method, program, or storage medium. More specifically, the present invention can be applied to a system including a plurality of devices or an apparatus including a single device.

The present invention is also achieved even by supplying a software program (in the embodiments, a program corresponding to the flowcharts shown in the drawings) which implements the functions of the above-described embodiments to the system or apparatus directly or from a remote site and causing the computer of the system or apparatus to read out and execute the supplied program code.

Hence, the program code itself, which is installed in a computer to implement the functional processing of the present invention by the computer, also implements the present invention. That is, a computer program itself, which implements the functional processing of the present invention, is also incorporated in the present invention.

In this case, the program can take any form such as an object code, a program to be executed by an interpreter, or script data to be supplied to the OS as long as the functions of the program can be obtained.

As a recording medium for supplying the program, for example, a floppy (registered trademark) disk, hard disk, optical disk, magnetooptical disk, MO, CD-ROM, CD-R, CD-RW, magnetic tape, nonvolatile memory card, ROM, or DVD (DVD-ROM or DVD-R) can be used.

As another program supply method, a client computer may be connected to a homepage on the Internet using a browser in the computer, and the computer program itself of the present invention or a compressed file containing an automatic install function may be downloaded from the homepage to a recording medium such as a hard disk. A program code that constitutes the program of the present invention may be divided into a plurality of files, and the files may be downloaded from different homepages. That is, a WWW server which causes a plurality of users to download a program file that causes a computer to implement the functional processing of the present invention is also incorporated in the present invention.

The program of the present invention may be encrypted, stored in a storage medium such as a CD-ROM, and distributed to users. Any user who satisfies predetermined conditions may be allowed to download key information for decryption from a homepage through the Internet, execute the encrypted program using the key information, and install the program in the computer.

The functions of the above-described embodiments are implemented not only when the readout program is executed by the computer but also when the OS or the like, which is running on the computer, performs part or all of actual processing on the basis of the instructions of the program.

The functions of the above-described embodiments are also implemented when the program read out from the storage medium is written in the memory of a function expansion board inserted into the computer or a function expansion unit connected to the computer, and the CPU of the function expansion board or function expansion unit performs part or all of actual processing on the basis of the instructions of the program.

The present invention is not limited to the above embodiments and various changes and modifications can be made within the spirit and scope of the present invention. Therefore, to apprise the public of the scope of the present invention, the following claims are made.

What is claimed is:

1. A coordinate input apparatus with region recognition, which calculates a pointed position by a pointer on a coordinate input region, comprising:
   calculation means for detecting the pointed position and calculating coordinates of the pointed position;
   region determination means for determining whether the coordinates calculated by said calculation means belong to a first region or a second region;
   pen-down state determination means for determining whether an input state of the pointer is a pen-down state where the pointer is touching the coordinate input region;
   setting means for setting pen-down information when said pen-down state determination means determines that the input state of the pointer is in said pen-down state, while setting pen-up information when said pen-down state determination means determines that the input state of the pointer is not in said pen-down state; and
   output means outputting the coordinates which belong to the first region and outputting the pen-down information regardless of the determination by said pen-down state determination means when said region determination means determines that the coordinates calculated by said calculation determination means belong to the first region, and outputting the coordinates which belong to the second region and outputting pen-down information or pen-up information set by said setting means on the basis of a determination result of said pen-down state determination means when said region determination means determines that the coordinates calculated by said calculation means belong to the second region.

2. The apparatus according to claim 1, wherein the first region includes a pen input region where input for drawing a locus on a screen or moving a cursor on the screen can be executed and the second region includes a switch input region where input of switch information can be executed.

3. The apparatus according to claim 1, further comprising light-receiving means arranged at a corner portion of the coordinate input region,
   reflection means, arranged at a peripheral portion of the coordinate input region, for retroreflecting incident light, and
   light-emitting means for illuminating the coordinate input region with light,
   wherein said calculation means calculates angle information corresponding to a point which crosses a predetermined level in a light amount distribution obtained from said light-receiving means and calculates the coordinates of the pointed position on the basis of the angle information.

4. The apparatus according to claim 3, further comprising proximity information generation means for generating proximity information representing whether a detected pointed state is in a proximity of the coordinate input region, on the basis of a change amount between a light amount distribution obtained from said light-receiving means in an initial state and a light amount distribution obtained from said light-receiving means in a coordinate input sampling state.

5. The apparatus according to claim 4, wherein the pen-down information is set in accordance with the proximity information in the first region.

6. The apparatus according to claim 5, further comprising switch information detection means for detecting switch information determined by a pointer having a switch actuating function,
   wherein the the pen-down information set in accordance with the switch information in the second region.

7. The apparatus according to claim 5, wherein the pen-down information is set in the second region in accordance with a change ratio between the light amount distribution obtained from said light-receiving means in the initial state and the light amount distribution obtained from said light-receiving means in the coordinate input sampling state.

8. The apparatus according to claim 1, wherein when pointing input is executed continuously from the second region to the first region, said output means outputs the coordinates which belong to the first region and outputting pen-down information or pen-up information set by said setting means on the basis of a determination result of said pen-down state determination means.

9. An information processing apparatus which has a coordinate input unit which calculates a pointed position on a coordinate input region, a display unit which is integrated with the coordinate input unit, and a display control unit which processes various kinds of information including information output from the coordinate input unit and controls the display unit, comprising:
   calculation means for detecting the pointed position and calculating coordinates of the pointed position;

region determination means for determining whether the coordinates calculated by said calculation means belong to a first region or a second region;

pen-down state determination means for determining whether an input state of the pointer is a pen-down state where the pointer is touching the coordinate input region;

setting means for setting pen-down information when said pen-down state determination means determines that the input state of the pointer is in said pen-down state, while setting pen-up information when said pen-down state determination means determines that the input state of the pointer is not in said pen-down state; and output means for outputting the coordinates which belong to the first region and outputting the pen-down information regardless of the determination by said pen-down state determination means when said region determination means determines that the coordinates calculated by said calculation determination means belong to the first region, and outputting the coordinates which belong to the second region and outputting pen-down information or pen-up information set by said setting means on the basis of a determination result of said pen-down state determination means when said region determination means determines that the coordinates calculated by said calculation means belong to the second region.

10. A control method of a coordinate input apparatus which calculates a pointed position on a coordinate input region, comprising:

a calculation step of detecting the pointed position and calculating coordinates of the pointed position;

a region determination step of determining whether the coordinates calculated in the calculation step belong to a first region or a second region;

a pen-down state determination step of determining whether an input state of the pointer is a pen-down state where the pointer is touching the coordinate input region;

a setting step of setting pen-down information when said pen-down state determination means determines that the input state of the pointer is in said pen-down state, while setting pen-up information when said pen-down state determination means determines that the input state of the pointer is not in said pen-down state; and an output step of outputting the coordinates which belong to the first region and the pen-down information regardless of the determination in said pen-down state determination step when said region determination step determines that the coordinates calculated in said calculation step belong to the first region, and outputting the coordinates which belong to the second region and outputting pen-down information or pen-up information set in said setting step on the basis of a determination result of said pen-down state determination step when said region determination step determines that the coordinates calculated in said calculation step belong to the second region.

11. A computer-readable medium for storing a computer program for execution to control a coordinate input apparatus which calculates a pointed position on a coordinate input region, comprising:

a program code for a calculation step of detecting the pointed position and calculating coordinates of the pointed position;

a program code for a region determination step of determining a region on the coordinate input region, to which the coordinates calculated in the calculation step belong;

a program code for a pen-down state determination step of determining whether an input state of the pointer is a pen-down state where the pointer is touching the coordinate input region;

a program code for a setting step of setting pen-down information when said pen-down state determination step determines that the input state of the pointer is in said pen-down state, while setting pen-up information when said pen-down state determination step determines that the input state of the pointer is not in said pen-down state; and a program code for a output step of outputting the coordinates which belong to the first region and outputting the pen-down information regardless of the determination in said pen-down state determination step when said region determination step determines that the coordinates calculated in said calculation step belong to the first region, and outputting the coordinates which belong to the second region and outputting pen-down information or pen-up information set by said setting means on the basis of a determination result of said pen-down state determination step when said region determination step determines that the coordinates calculated in said calculation step belong to the second region.

12. The apparatus according to claim 9, wherein the first region includes a pen input region where input for drawing a locus on a screen or moving a cursor on the screen can be executed and the second region includes a switch input region where input of switch information can be executed.

13. The method according to claim 10, wherein the first region includes a pen input region where input for drawing a locus on a screen or moving a cursor on the screen can be executed and the second region includes a switch input region where input of switch information can be executed.

14. The medium according to claim 11, wherein the first region includes a pen input region where input for drawing a locus on a screen or moving a cursor on the screen can be executed and the second region includes a switch input region where input of switch information can be executed.

* * * * *